United States Patent [19]
Harris et al.

[11] 3,828,398
[45] Aug. 13, 1974

[54] METHOD AND APPARATUS FOR SHUCKING BIVALVES

[75] Inventors: Sterling G. Harris, Beaufort; Joseph D. Smith, Orangeburg; David D. McCall, Orangeburg; Glenn S. Moore, Orangeburg, all of S.C.; William P. Hidden, Wenham; Noel Svendsen, Bedford, both of Mass.

[73] Assignee: Harris Automated Machinery Company, Beauford, S.C.

[22] Filed: May 6, 1971

[21] Appl. No.: 140,686

[52] U.S. Cl............................. 17/74, 17/48, 53/28, 269/26
[51] Int. Cl............................................ A22c 29/00
[58] Field of Search.............. 17/74, 48, 76, 53, 54; 99/567, 568, 576, 581, 582; 29/563; 279/1 DA, 1 DC, 1 R, 4, 109, 110; 269/20, 25, 26, 196, 199, 228; 198/33 R, 60, 61, 62; 53/28

[56] References Cited
UNITED STATES PATENTS

| | | | |
|---|---|---|---|
| 848,784 | 4/1907 | Torsch et al............................ | 17/74 |
| 1,445,672 | 2/1923 | Egli......................................... | 17/76 |
| 2,882,771 | 4/1959 | Blazek............................ | 269/26 UX |
| 3,026,658 | 3/1962 | Schneider et al........................ | 53/28 |
| 3,239,877 | 3/1966 | Lapeyre et al.......................... | 17/74 |
| 3,473,191 | 10/1969 | Evans...................................... | 17/74 |
| 3,605,180 | 9/1971 | Harris et al............................. | 17/74 |

FOREIGN PATENTS OR APPLICATIONS

| | | | |
|---|---|---|---|
| 165,454 | 10/1955 | Australia.............................. | 269/26 |

*Primary Examiner*—Lucie H. Laudenslager

[57] ABSTRACT

A bivalve shucking machine includes a spider rotatable about a vertical axis, on the arms of which are mounted bivalve holders the jaws of which are differentially operated to grip successive bivalves fed thereto, from which a substantial part of the liquid between the shells has been removed, and in the same orientation in which the hinge end is upward and the center of the adductor muscles are at the same distance from the axis of rotation of the spider. The spider is rotated to bring the bivalve beneath one or more vibrators, the vibrators then being lowered to bring them into engagement with the bivalves, and the vibrators then operate to vibrate the shells to cause the meat to fall into the lower parts. The bivalves are then raised at another station of the holders between two gripping members mounted on a rotating table and gripped between the gripping members, whereupon the holder is released and moved downward. The bivalves are then moved past a rotating saw blade which cuts off enough of the tops to remove the hinge and leave a hole. At a further station, the upper edges of the shell adjacent the hole are arranged from the inside and the outside, the gripping force is reduced while the upper edges are puller apart and then gripped more securely. Knives are passed from above downward through the enlarged hole between the shell engaging members to sever the adductor muscles and, passing completely through the bivalve, to spread apart the lower end of the shells to allow the meat to drop out between the bottom ends of the shells. The engaging members are released, and the shells are carried to another station and dropped.

95 Claims, 36 Drawing Figures

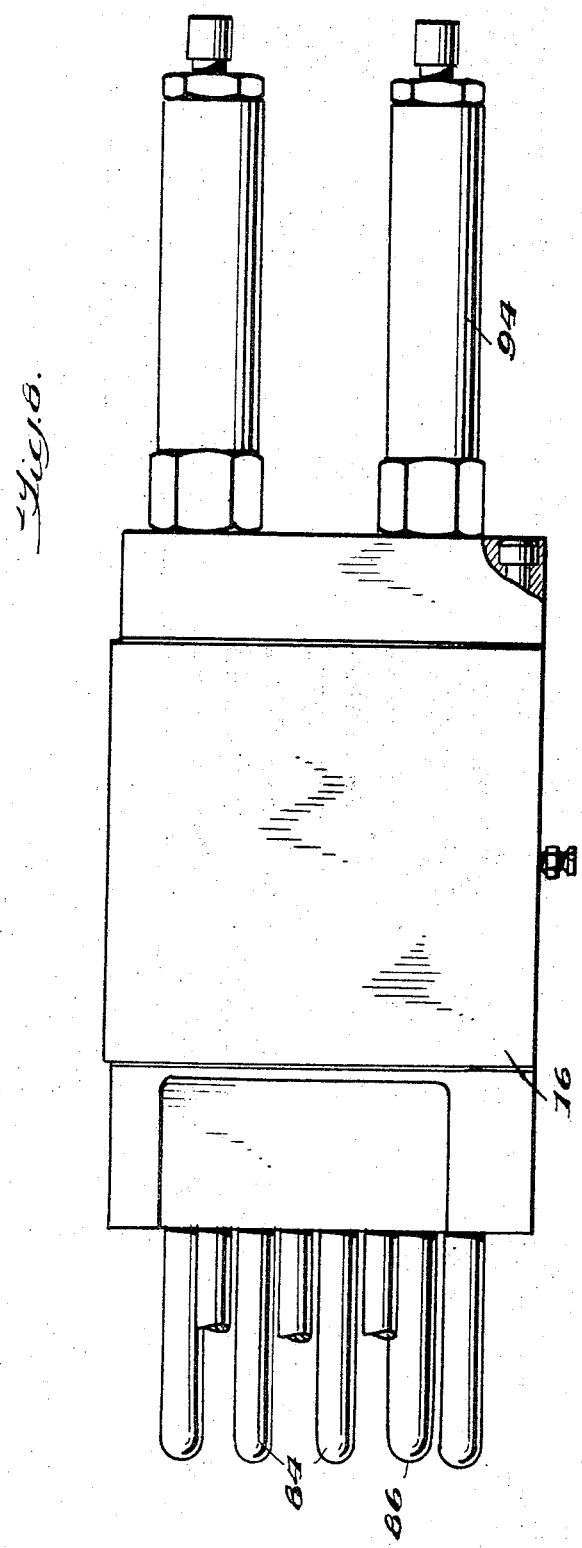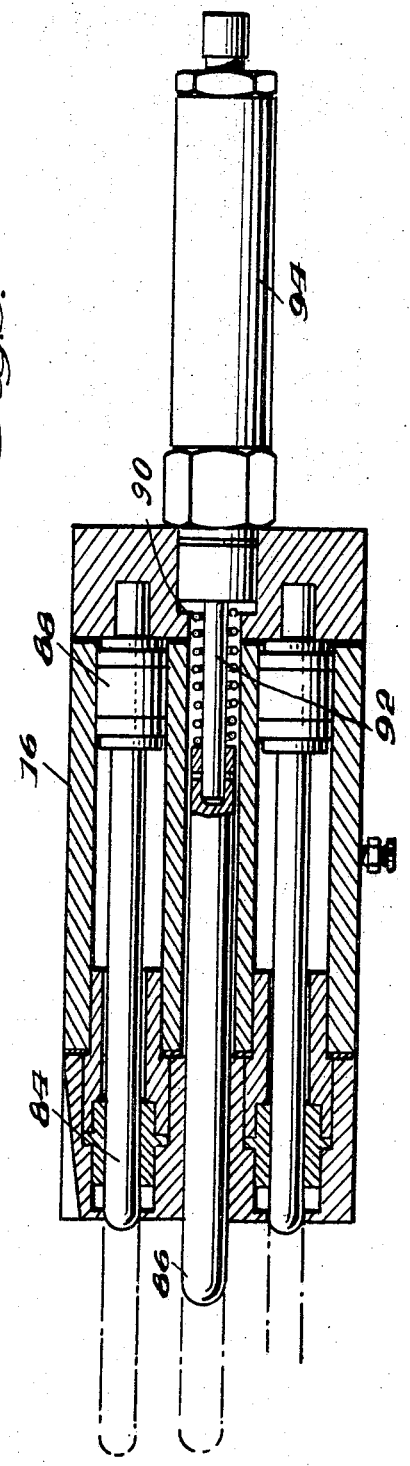

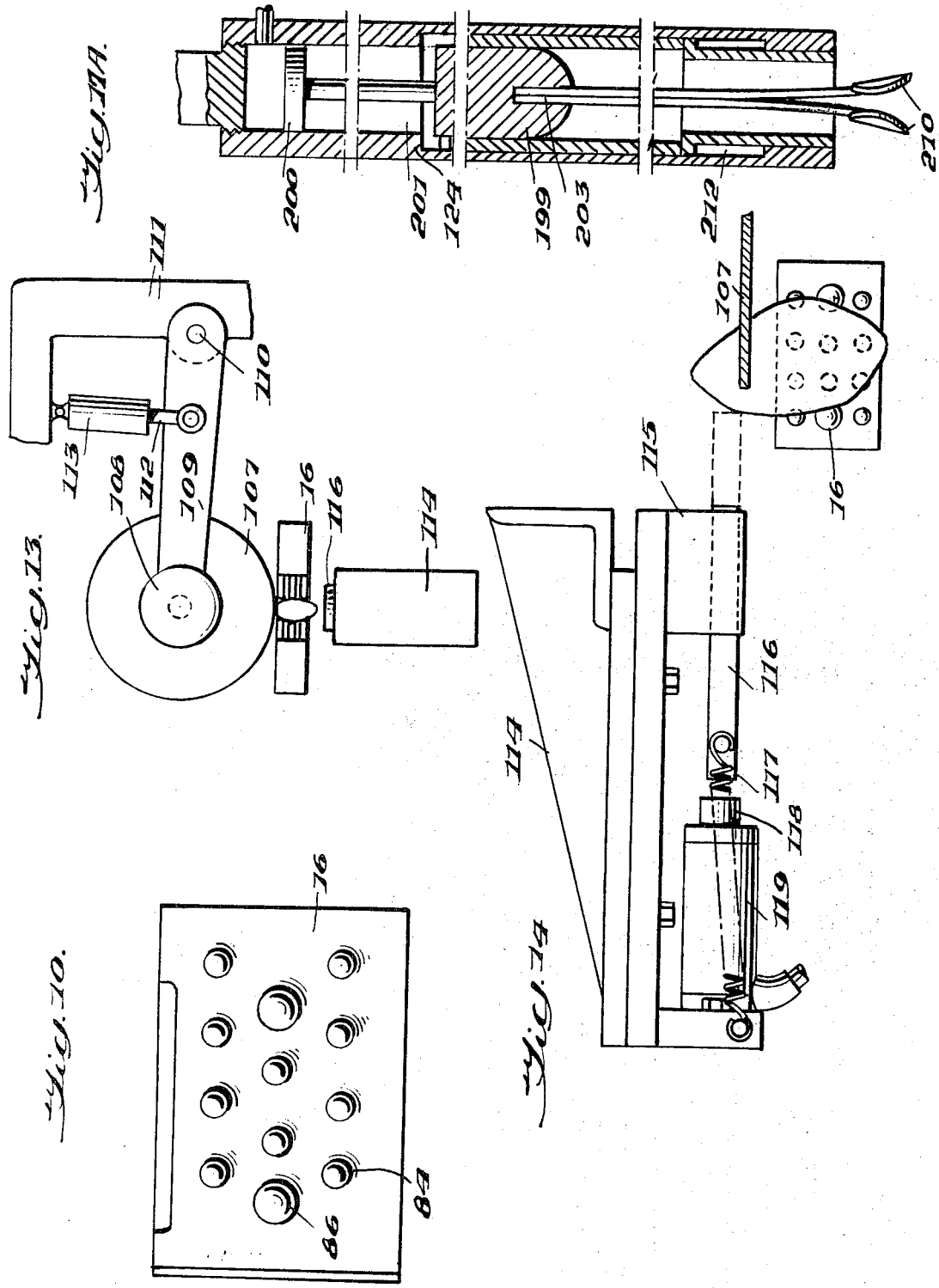

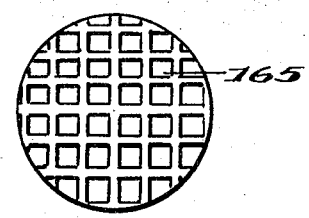
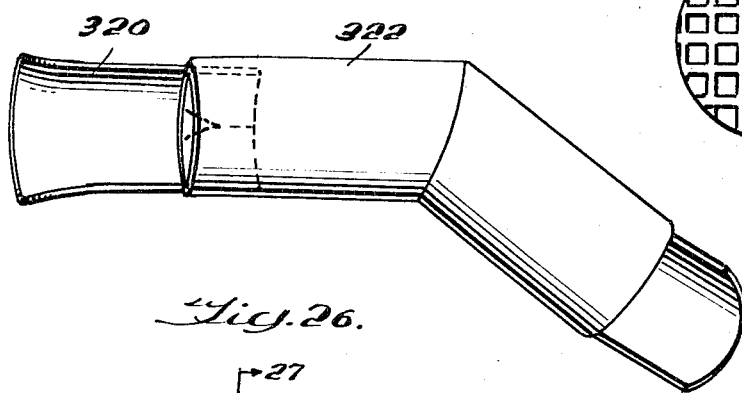
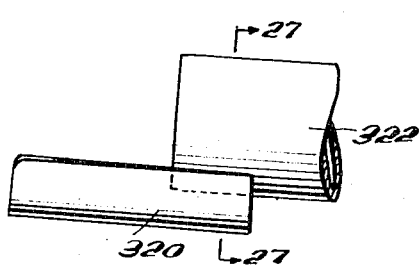
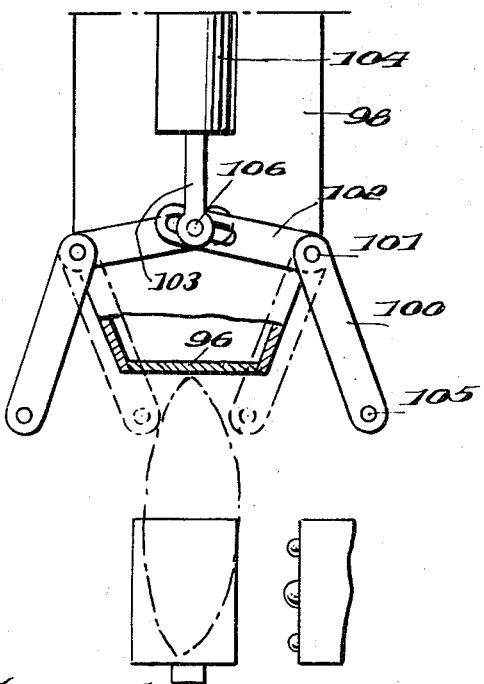
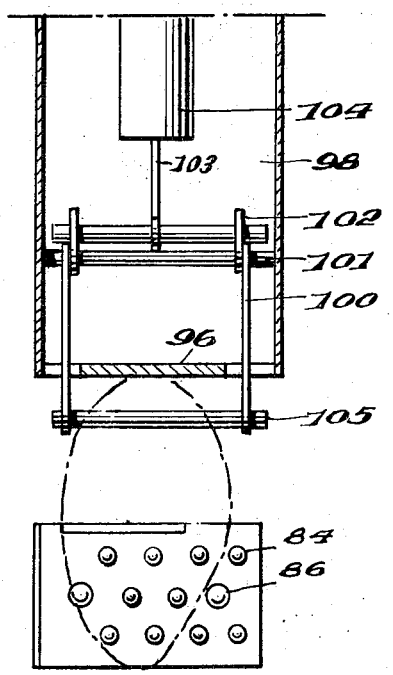
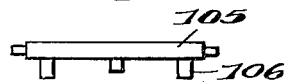

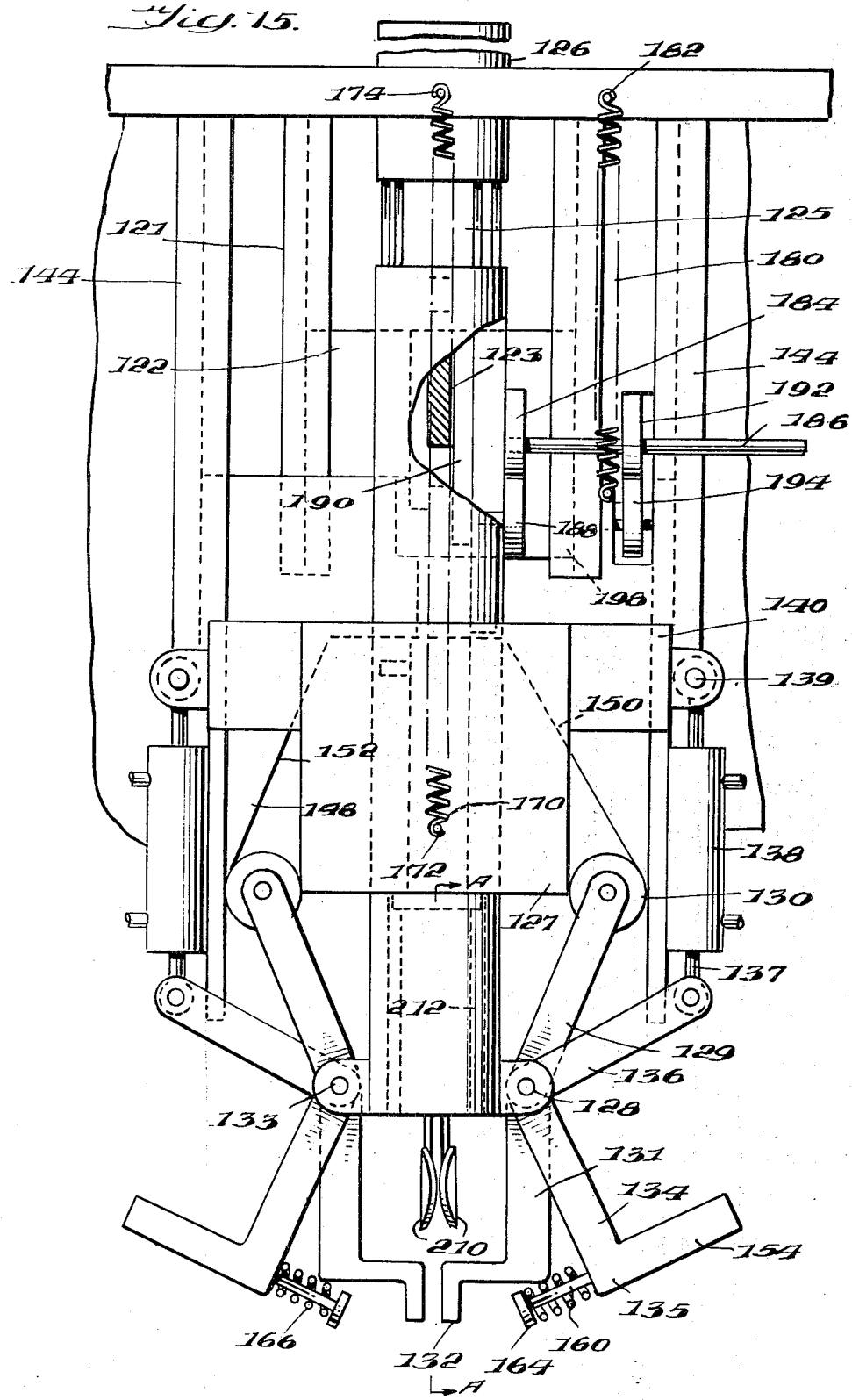

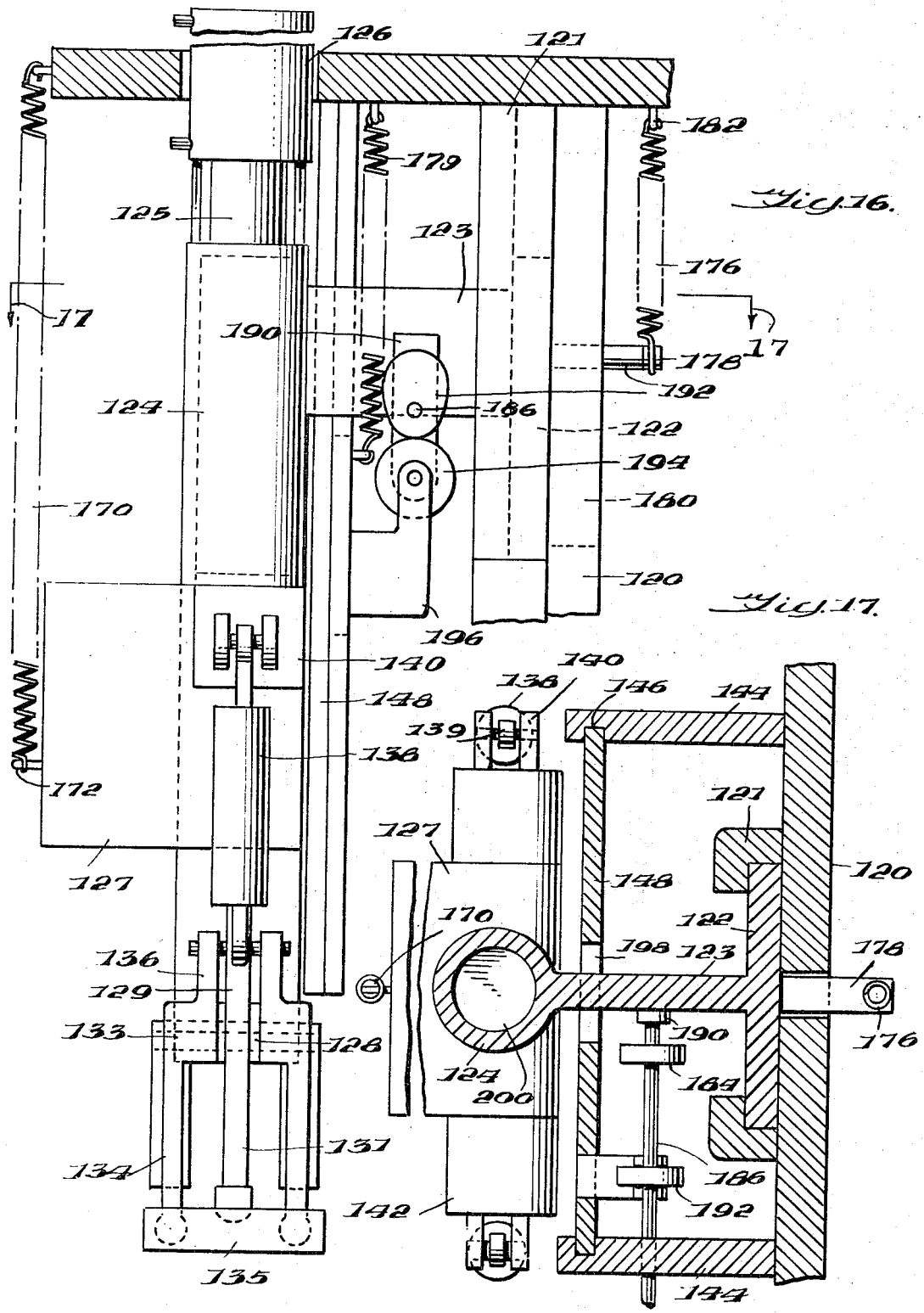

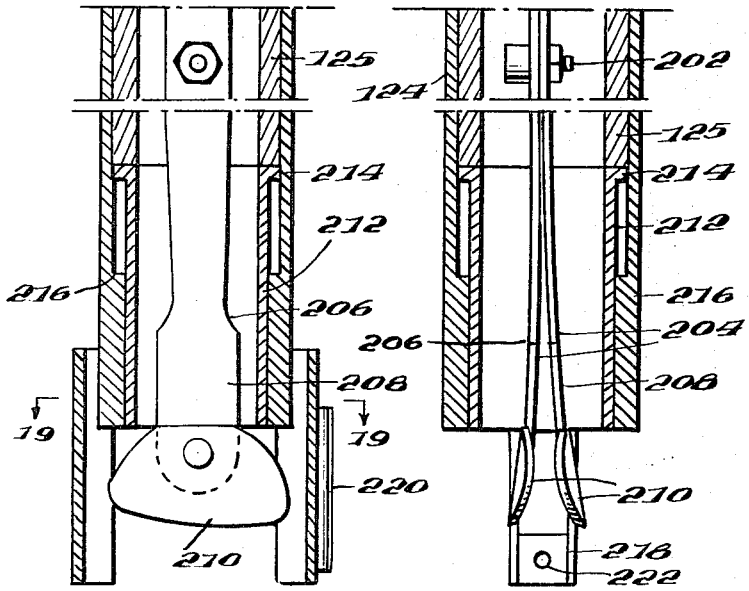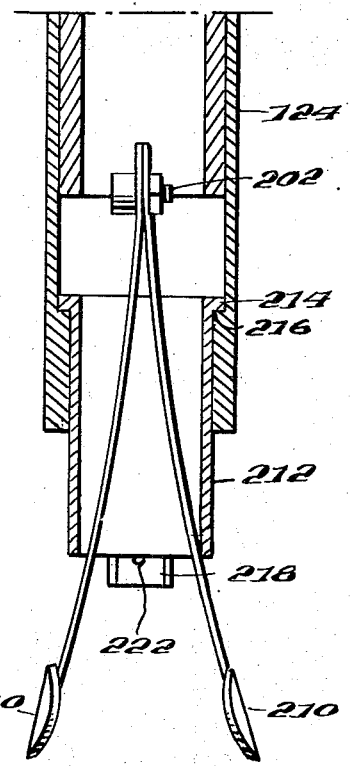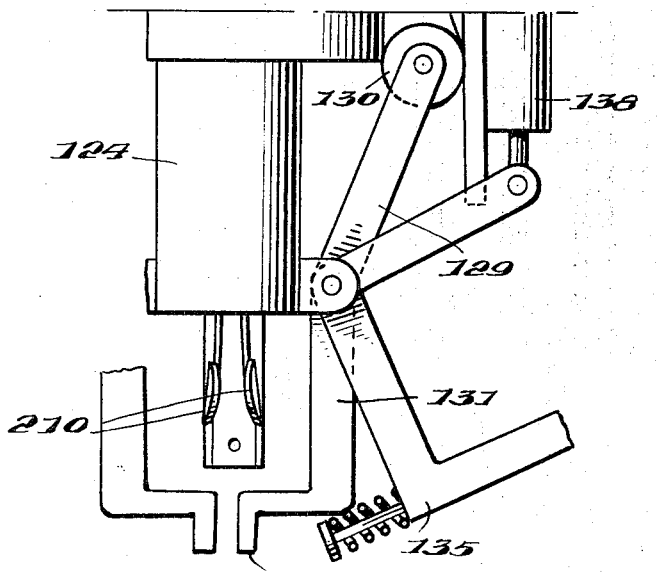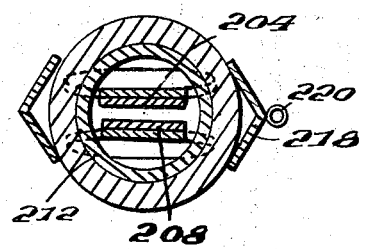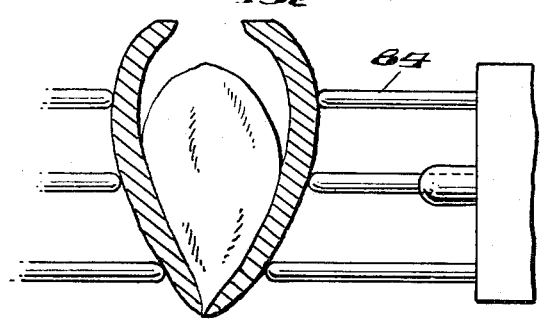

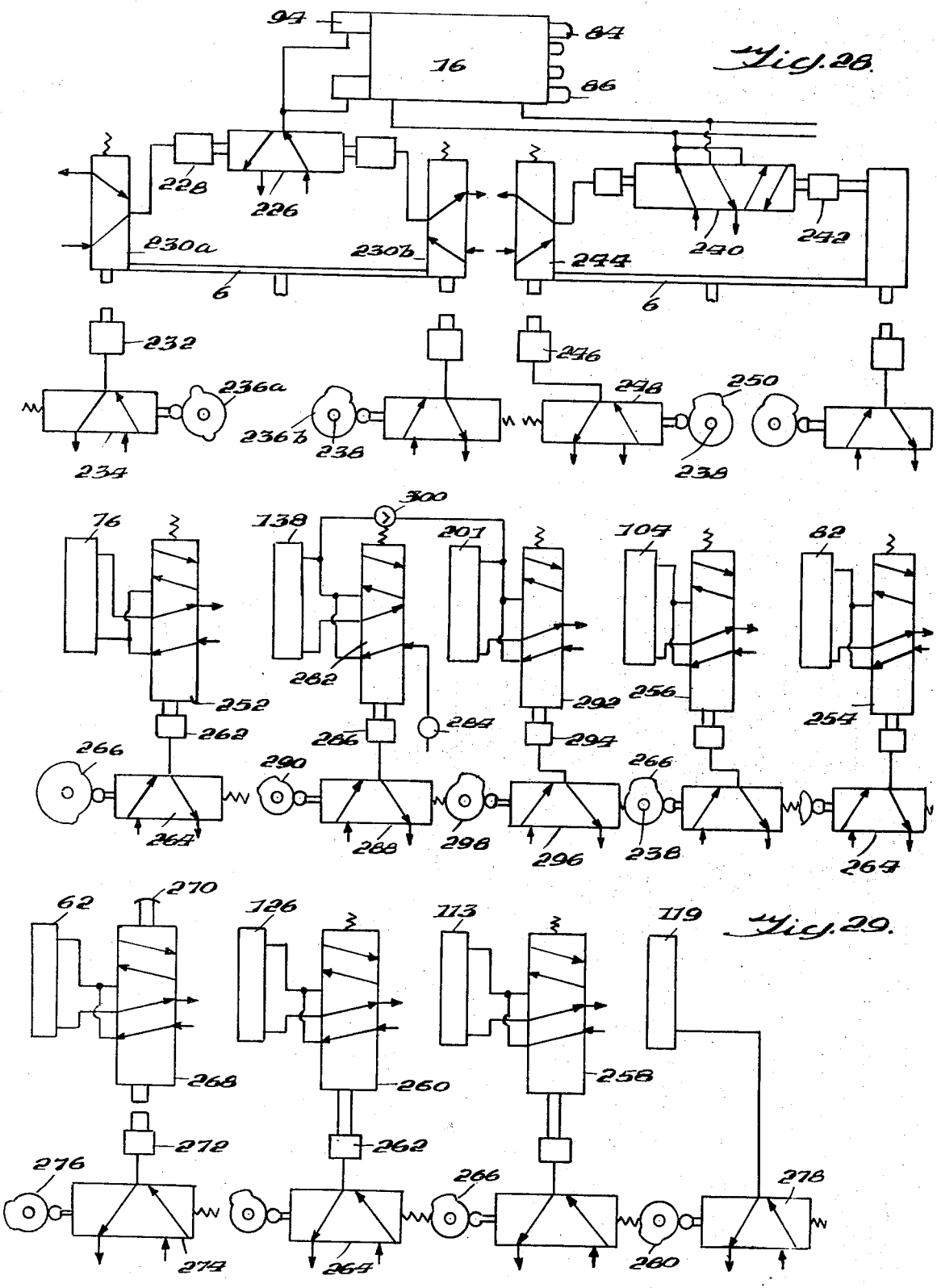

METHOD AND APPARATUS FOR SHUCKING BIVALVES

BACKGROUND OF THE INVENTION

1. Field of the Invention

The invention relates to an apparatus and a method for shucking bivalves, as well as to improvements in certain parts of said apparatus and method.

2. The Prior Art

The patent ot Torsch, U.S. Pat. No. 848,784, shows an apparatus for shucking oysters in which the top part of an oyster is removed by passing the oyster under successive grinding wheels, while held in clamps turning about a horizontal axis, whereafter the ground-off ends of the oyster are spread apart, and knives are inserted into the spread apart ends to sever the adductor muscles. Thereafter, the oyster is inverted to discharge the meat between the knives.

Prior U.S. Pat. No. 2,832,989 describes a process in which, in order to promote easier opening, a bivalve is subjected to a shocking treatment in order to facilitate the release of the oyster from the shells.

U.S. Pat. No. 3,605,180, issued Sept. 30, 1971, discloses an apparatus which improves on the Torsch device in several respects, in that the oyster is maintained in an upright position throughout its travel, and the muscle severing members move down through the oysters at the adductor muscle cutting station to open the lower ends of the shells and allow the severed meat of the oyster to drop out between such spread lower ends.

SUMMARY OF THE INVENTION

The present invention presents a number of improvements over the apparatus and method described in the U.S. Pat. No. 3,605,180.

Several preliminary functions must be completed with the bivalves before they can be most satisfactorily shucked by the machine described herein, including washing them to remove all foreign material adhering to the shells. Also, the fluid or "shell water" entrapped between the two shells in which the meat is suspended in flotation must be drained off.

These two preliminary steps can be accomplished together by passing the bivalves through a slowly revolving cylindrical metal drum about 5 feet in diameter and 9 feet long having sides composed of metal slats or vanes about 9 inches wide which have about 3 inches of their corresponding lineal edges turned up at 20°. The severity of the shock can be increased by speeding the rotation. The speed with which the bivalves make the longitudinal transit of the drum depends principally on the angle of the longitudinal axis of the drum with the foundations upon which it rests.

A water spray to clean the oysters passing through the drum is furnished by a perforated pipe extending through the drum slightly off center.

In shucking raw oysters mechanically the lip edges of the shells must be opened slightly to drain off "shell water" by shocking as in a rotating drum as above described to provide an empty space between the shells to accomodate the stomach end of the oyster meat when said section of oyster meat slides down and backward under mechanical vibration while held in position by the feeder holder. Such vibrations to be successful must follow in rapid sequence after the "shell water" has been removed by the shocker tumbler. The practice of this novel sequence has been found successful in eliminating completely all damage to oyster stomach by the saw blade. This achievement is of great importance in the oyster shucking industry because an oyster with a cut stomach will later lose about 25 percent of its weight (bleeding). It is the most destructive act that can happen in shucking and a hand shucker that is persistently guilty of doing it will be fired. The present machine has proven that its percentage of such damage to the stomach as well as to all parts of the oyster meat is much lower than that of the very best hand shuckers.

The earlier application describes the "shocking" of the oyster by tumbling it in a drum in order to remove a part of the liquid from between the shells, in order to permit the meat of the bivalve to fall down within the shells, when they are held in upright position, in such a way as to allow the top parts of the shells to be cut off without damage to the meat. According to the present invention, further assurance that the meat will not be damaged by the cutting operation is provided by one or more arrangements which vibrate the shells up and down before the cutting operation takes place, so that the meat is more assuredly pushed into the lower part of the shells and out of the path of the saw blade According to a further feature of the present invention, it has been observed that the adductor muscles are located at substantially proportional distances from the two edges of the shells, regardless of the legthwise dimensions of the bivalve. The present invention provides a proportional positioning device which includes a pair of jaws moving from opposite directions to grasp the shells edgewise and in upright position, these jaws being mounted on a rotating carrier member and being moved by proportionally varying distances towards each other so as to grip the bivalve, when it is presented to the jaws in proper orientation, in such a way that the adductor muscles are always at substantially the same distance from the axis of rotation of the carrier.

By engaging the oyster between jaws each of which moves toward the edges of the oyster at different speeds, so calculated as to position the oyster in the holder proportionately to the width of its shells, the shucking blades at the shucking station will descend vertically through the oyster so that the center of the knives will cover accurately the centers of the ends of the adductor muscles of an oyster at their points of attachment to the interior surfaces of its two shells. It has been possible to determine the approximate center of the muscle attachment which varies in distance from the front edge of the oyster (edge facing machine or axis of rotation of the carrier for the jaws) according to the horizontal width of its shells at their widest points, since, the broader the shells, the further the center of the muscle will be removed from the front edge of the shells, and the jaws are automatically and accurately adjusted to such graduations. Since the shucking knives descend always in a fixed position, this means that, by adjusting automatically each oyster in the holder so that it muscle centers attached to the shells will be directly under the centers of knives, precision and accuracy of shucking can be achieved regardless of oyster sizes.

The bivalves so gripped are to be carried past a device for cutting off the tops and then fed to a shucking device which includes knives which are moved into the shell to sever the adductor muscles, the path of movement being such as to maintain the adductor muscles in the same relation transversely of the path of movement. The knives occupy a fixed position with respect to this path, so that when they pass into the shells the adductor muscles are always within the path of movement of the knives.

An oyster held in the jaws is then moved to a following station where the holder is made to assume an angle of 18° by a cam below it. The top end of the oyster is now covered by a round cap attached to the shaft of a vibrator located above it. In this position vibrations are applied by the cap to the oyster which cause the unattached, uppermost part of the oyster meat in this end of the oyster, known as the stomach, to slip down and backward into a space between the shells previously emptied of free liquid while being tumbled. This top part of the oyster meat in this position is now well below the line of cutting of the hinge end of the shells by the blade at the next station and thus escapes injury. The bivalve will be vibrated three times for a space of approximately one and a third seconds each.

The holder now returns to an upright position and moves directly under the open space between the two clamps attached to one of four carriages which are carried by a rotating table. These clamps contain pins slidable out of their opposed faces, which at this time have been retracted.

In this position, the bivalve gripped by the jaws, is raised vertically from its lower position into the open space between the clamps. The top end or hinge of the bivalve comes into contact with a stationary plate which stops its upward progress as well as that of the entire holder unit, thus determining the vertical height at which the saw blade will later sever the hinged end of the oyster. Centering bars are then lowered from both sides against the top portions of the oyster shells, thereby centering the oyster in position between the clamp. Pins actuated by air pressure are ejected from the clamps against both sides of an oyster, gripping it immovably. The jaws of the holder are then retracted and the feeder holder assembly is returned to its original lowered position.

A further feature of the invention is the provision at the point of transfer from one carrier member to the other of the centering means described above for centering the bivalve properly between the gripping jaws before the pins of the clamps are pushed out to engage the shells.

Another feature of the invention lies in the gripping means which hold the oyster during the removal of the top and the opening and shucking operations, and which are carried by the table and to which bivalves are transferred from the holder. The bivalves must be held quite firmly during the shell cutting operation, since the shell is quite hard and the resistance offered to the saw blade is substantial. On the other hand, during the separation of the shells to allow the discharge of the meat, the resistance to movement of the shells apart from each other must of course be substantially reduced.

For this purpose, there are provided gripping clamps having a plurality of pins slidable out of their faces into engagement with the shells of the bivalve. A majority of these pins are operated by substantial pneumatic pressure, so that they engage against the outside of the shell with a substantial force, thus holding the bivalve firmly during the cutting off of the top. On the other hand, during the opening operation, larger pins are provided which are only pushed forward by spring action against the outside of the shell (the other pins being retracted at this time), these pins being capable of being withdrawn by pneumatic pressure overcoming the force of the springs.

The machine further includes, opposite the saw blade, a back-up member which is moved against the top portions of the shells and held against them by pneumatic pressure during the cutting operation. This back-up member has an important part in preventing the pressure of the saw blade from tilting the shells which can result in sticking or breaking of the saw blade or damage to the shells such as would prevent their prompt opening at the shucking station. However, this feature of the machine is an invention of Sterling G. Harris and Ben P. Zober, and is being made the subject of a separate application.

A further feature of the invention is the provision at the shucking station of anti-spreaders cooperating with the spreaders shown in the prior U.S. Pat. No. 3,605,180. These anti-spreaders are brought into engagement with the outer sides of the tops of the shells, while the insides are engaged by the spreaders of the type shown in the prior application. In effect, these anti-spreaders along with the spreaders grip the top edges of the shells between them in such a way as to permit by swivelling action the outward tilting of the btoom edges of the shells when the shucking knives move through, sever the adductor muscles and then spread apart the bottom ends of the shells to permit the discharge of the meat therethrough.

Additionally, the prior application describes a construction for preventing the spreading apart of the bottom ends of the knives until they have moved into the shells. The present application provides an improved mechanism for accomplishing this result.

According to the present invention, an oyster upon arriving at the shucking station exposes the edges of the collar formed by the upper edges of the shells after the hinged end is cut off. Nothing is in contact with the oyster except the smaller pins, the larger pins being retracted. Just above the oyster is a tracking guide for the front ends of the shucking knives. In back of the tracking guide is another tracking guide for the back ends of the shucking knives. Above and on both sides of the oyster collar are other component parts of the shucking assembly which are the interior arms and exterior arms comprising a unit of shucking clamps. The exterior arms which are connected to and operate in conjunction with interior arms mounted on housings each containing three spring-loaded-swivel-headed grips.

After the bivalve is in position, the entire shucking assembly is lowered until tracking guides reach a position at the top of the collar and the exterior arms have brought the swivel-headed grips in contact with the outer surfaces of the collar. The larger pins (activated forwardly by springs and backward by air) 72. now closed against the shells in anticipation of the descent of the shucking knives.

The interior arms of the shucking clamps have two feet entering the cavity of the oyster. Their action will be to press outward on the interior of the collar while the swivel heads of the outer grips press inward against the outside surface of the oyster collar. If the opening between the shells is small, the pressure of the two feet can force the shell apart for a limited distance against the pressure of the grips, but at a measured distance the two pressures become equalized. At that point the pressures of both sets of the shucking clamps create a firm grip on the collar of the oyster to the extent that, when the shucking knives descend, it provides sufficient support for both shells even when all the smaller pins are retracted to prevent the oyster slipping down.

The two shucking knives now descend with their front ends and their back ends held together by the tracking guides. In operation the two tracking guides will hold the ends of the shucking knives together until they descend in the open oyster beyond its collar. If they fully expand above the collar, they could collide with it. This could happen especially with small oysters that have small circular curves in the collar and is one reason to provide the interior arms for widening the opening at the top.

By closing the bottoms of the oyster shells with the larger pins (small pins retracted) and opening the space between the tops, a large V is created which will add to the pressure of the back of the knives against the interior of the shells at the points of the adductor muscle attachments to the shells ensuring a clean and accurate severing of the adductor muscles from the shells.

After the ends of the two shucking knives in their descent are safely below the collar they will expand immediately against the interior surfaces of the shells in order to sever the ends of the adductor muscles.

The shucking knives then complete their descent through the oyster, severing the ends of the adductor muscles of the meat and freeing it to be shucked out by the knives. At this point, the major pins are retracted to avoid having the top edges of the knives collide with the edges of the shells as they go up.

The V position of the shells disappears as the knives proceed downward and cut the meat free, expanding as they do until they reach full expansion, when the two shells assume vertical positions, and thereafter the shells assume again the adjacent positions they earlier held. It is important in complete mechanical shucking by the present machine that the oyster be made to assume the above positions and they must all be performed in about two seconds or less, which is faster than the eye can follow. To do this requires a unique mechanical coordination of all working parts, and one of the important features is the shucking clamps composed of the interior arms and exterior arms in creating both a gripping and swivelling action on both sides of the oyster collar, which permits the shells below the collar to move back and forth laterally while in the grip of these shucking clamps, preventing the shells from slipping vertically or the collar from breaking as could happen with weak shells.

Now the entire shucking assembly moves away from the oyster, the larger pins move in place again against the shells and the carriage will mov to the next and the last station where the pins will be retracted, permitting the empty shells to drop.

BRIEF DESCRIPTION OF THE DRAWINGS

In the drawings:

FIGS. 8 and 9 show, in top plan view and in transverse section respectively, the claims for holding the bivalve during cutting and shucking;

FIG. 10 is a front view of one of these clamps;

FIG. 11 shows in front view and FIG. 12 in side view the centering mechanism;

FIG. 12A is a detail of a part of FIG. 12;

FIG. 13 is a top plan view of the cutting mechanism;

FIG. 14 is a side elevation of the back-up member for the cutting mechanism;

FIG. 15 shows in front elevation the shucking mechanism;

FIG. 16 shows this mechanism in side view, and FIG. 17 is a cross-section substantially on the line 17—17 of FIG. 16;

FIG. 17A is a vertical cross-section through the moving means for the knife carrier;

FIGS. 18A, 18B and 18C show the knife mounting arrangement; FIG. 18A being a section on the line A—A of FIG. 15, and FIGS. 18B and 18C being cross-sections at right angles to FIG. 18A and showing the knives in two different positions;

FIG. 19 is a cross-section on the line 19—19 of FIG. 18A;

FIGS. 20A, 20B, 20C, 20D, 20E, 20F and 20G show the shucking mechanism in various successive positions during its operation;

FIG. 24 is an end view of one of the clamping members of FIG. 21;

FIG. 25 shows in plan view and FIG. 26 is a side elevation thereof, and FIG. 27 is a cross-section on the line 27—27 of FIG. 26;

FIGS. 28 and 29 are diagrams showing the pneumatic system.

DESCRIPTION OF THE PREFERRED EMBODIMENTS

OVERALL MACHINE

A carrier 2 is driven step by step, as by a Geneva-gear, to turn about a vertical axis. Its path includes six stations, five of which are active in the operation. These include a load station $A_2$, three vibration stations $B_2$, and a transfer station $C_2$. A table 6 also mounted to turn about a vertical axis has four positions, and is likewise driven by a Geneva-gear in synchronism with the carrier 2. These positions are a transfer position $A_6$, a saw position $B_6$, a shuncking position $C_6$ and a shell discharge position $D_6$.

In general, in the operation of the device, bivalves are fed by hand edge-wise at the position $A_2$ between a pair of holding jaws 10, 12, the bivalve such as an oyster being shown at 14. The bivalve still gripped in the jaws is them moved successively to the three vibration positions at each of which it is vibrated for about two seconds. It then goes to the transfer position $C_2$ where the bivalve is raised up between a pair of gripping devices 16 mounted on the table 6. The gripping devices are actuated to engage the sides of the shells of the bivalve, and the jaws 10, 12 are separated and retracted downward. The bivalve is then moved by step-by-step rotation of the table 6 to the saw blade position $B_6$ where the top is cut off. It is then moved to the shucking position $C_6$, where the tops of the shells are spread apart, and knives are then introduced from the top of the shells which sever the adductor muscles and thereafter spread apart the lower ends of the shells so that the meat drops out through the spread-apart open lower ends of the shells. The empty shells are then carried to the position $D_6$ where they are released and dropped.

SHOCKING MECHANISM

Figure 3:
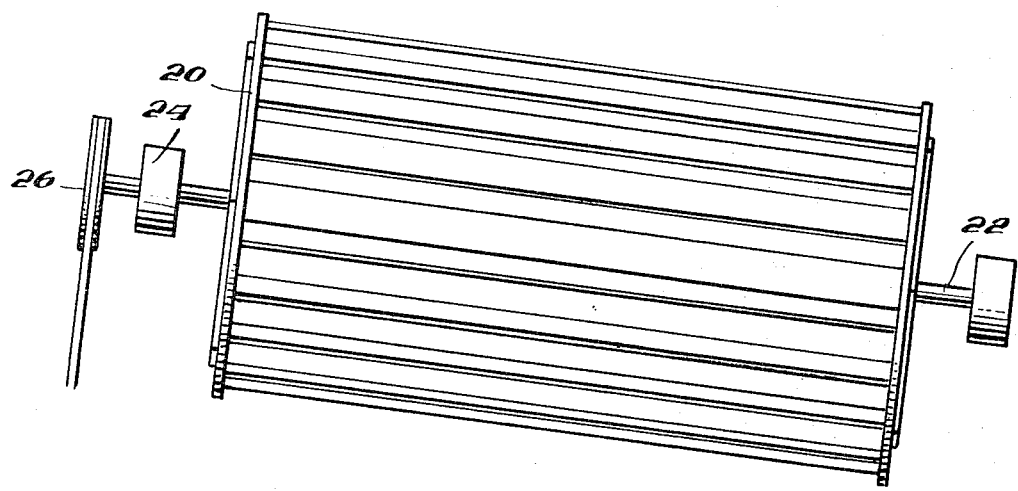
FIG. 3 shows in side elevation.
Figure 4:
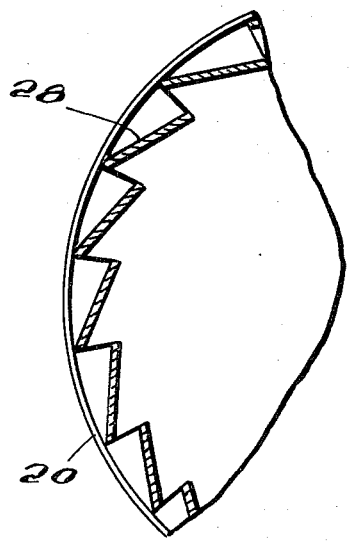
FIG. 4 shows in partial section, a shocking drum embodying the invention.

The oyster has previously been shocked by being placed in a drum 20 (see FIGS. 3 and 4). This drum rotates about axes 22, mounted in bearings 24 and driven for example by a pulley 26. As shown in FIG. 4, the drum wall is formed of a plurality of slats 28 which slope in such a way as to leave spaces between them and in such a way as to engage and tumble the bivalve about as the drum rotates. Such a device is previously known.

PROPORTIONAL HOLDING DEVICE

Figure 1:
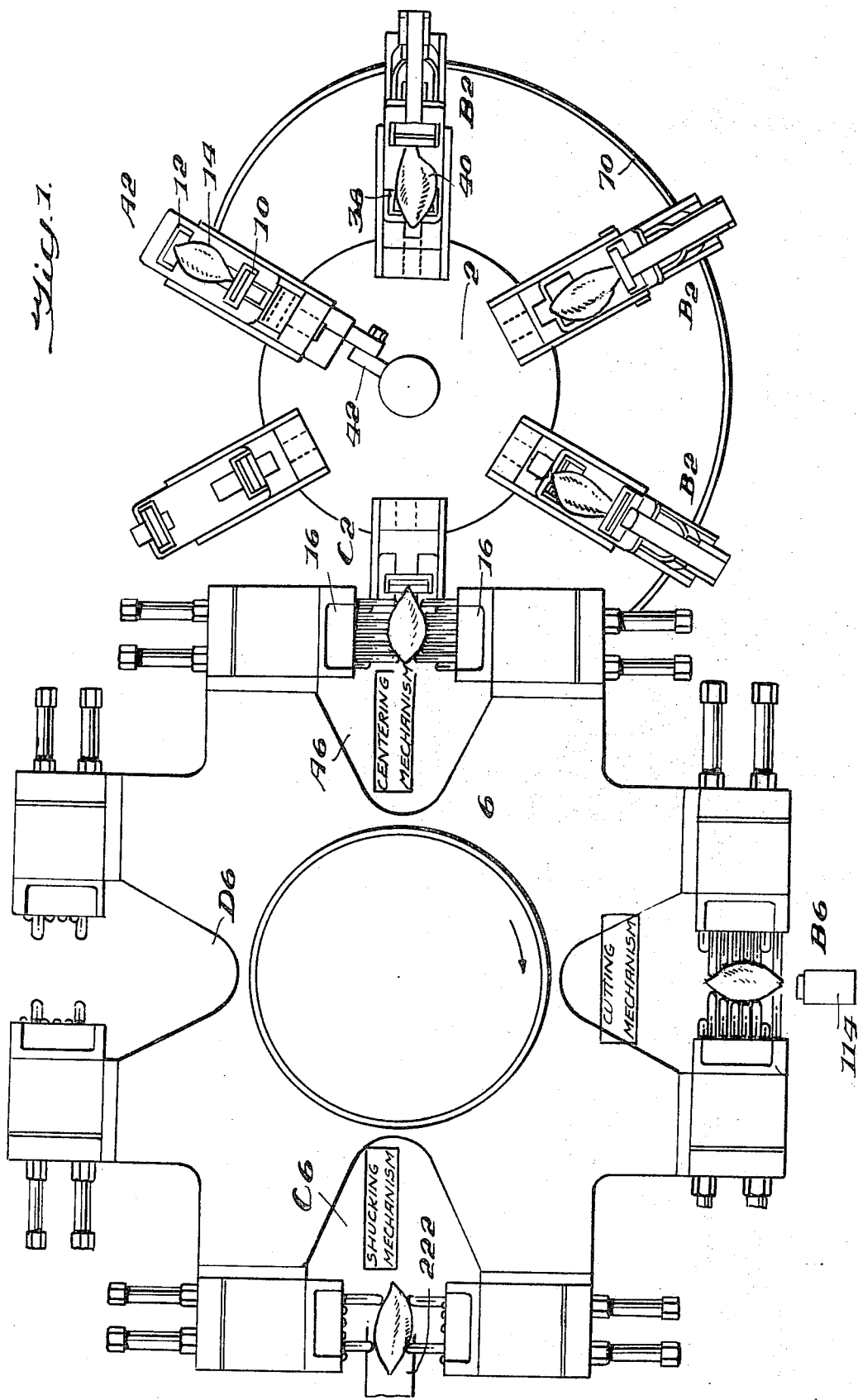
FIG. 1 shows in top plan view the arrangement of a machine embodying the invention, certain of the operating parts of which are shown in detail in other figures being only indicated by legends for the sake of simplicity.
Figure 7:
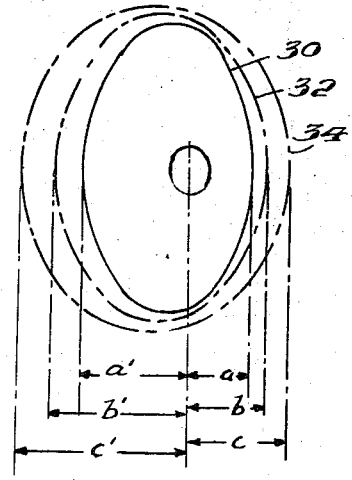
FIG. 7 is a diagram related to FIGS. 5 and 6.

Referring now to FIG. 7, there is shown in solid, in broken and in dot and dash lines, and designated as 30, 32 and 34 respectively, three oyster shells of differing width. It has been found that the centers of the adductor muscles 36 in all the shells will be at substantially proportional distances from the two edges of the shell, that is, the ratios $a/a'$, $b/b'$ and $c/c'$ are substantially the same. This holds good whatever may be the vertical dimension of the oyster, as long as the oysters are positioned in the same orientation, that is, with the bottom shell (which is normally much more rounded) in the same relation with regard to the top shell which is less rounded. For example, as is shown by the oyster at the first position $B_2$ in FIG. 1, the top shell 38 is above and the bottom shell 40 is below, that is to the right and left respectively of the operator who inserts the bivalve. It is quite important that the bivalves be inserted with this relationship being preserved.

It is essential by reason of this location of the adductor muscles that the bivalve be presented to the adductor muscle cutting knives, which move in fixed paths, with the adductor muscles in the same relationship to the path of movement, transversely thereof.

Figure 5:
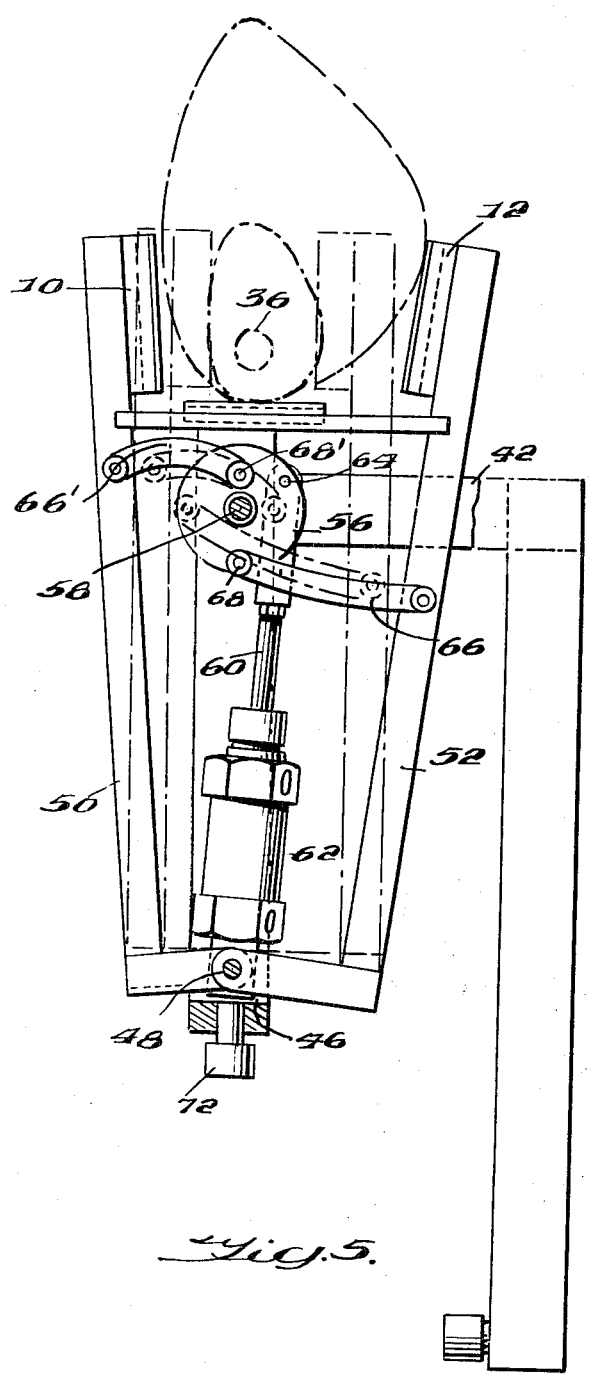
FIG. 5 shows in side elevation.
Figure 6:
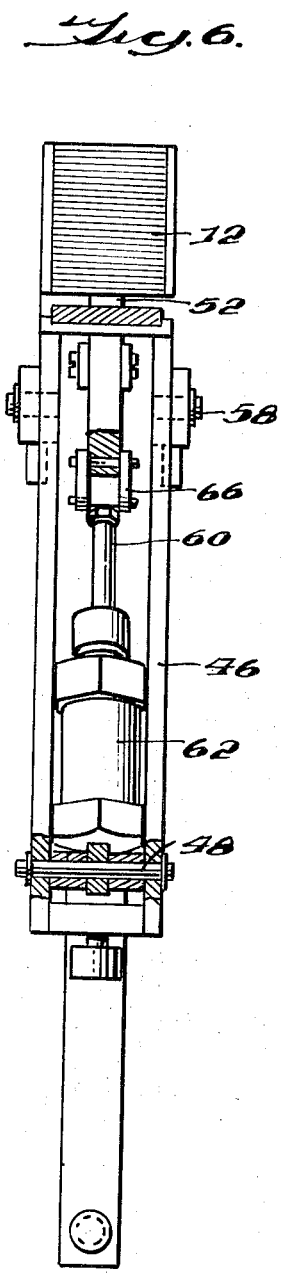
FIG. 6 shows in a view at right angles to FIG. 5, a proportional holding mechanism.

This is accomplished by the proportional holding device illustrated in FIGS. 5 and 6. This device is mounted on lugs 42 extending radially outwardly from vertical members 43 mounted for vertical sliding movement in the carrier 2, only one of these lugs being shown in FIG. 1 for the sake of clarity. The lug has pivoted to it at 44 bars 46, to the lower ends of which are pivoted at 48 arms 50 and 52. These arms have at their tops the holding members 10 and 12 which have roughened or ribbed surfaces of frictional material so as to grip the oyster. The arms are moved towards and from each other by the rotation of a disc 56 mounted on a shaft 58 turnable in the bar 46 by a piston rod 60 slidable in pneumatic cylinder 62 and pivoted in 64 to the disc 68. The arms 50 and 52 are connected to disc 56 by links 66, 66' pivoted to the disc at 68, 68' respectively. Link 66 is longer than link 66', is pivoted to arm 52 at a point closer to the pivot 48 than the pivot point of link 66' to arm 50, and pivot 68 is further from the axis 58 than pivot 68'.

Thus, upon actuation of the piston rod 60, the arms are moved through proportionally different distances towards each other. The proportioning is such that, as shown in FIG. 5, the bivalves will be gripped in such a way that the adductor muscles, indicated in broken lines at 36 in FIG. 5 will always be in substantially the same location radially with respect to the carrier 2, or at the same distance from its axis of rotation.

VIBRATING MECHANISM

Figure 2:
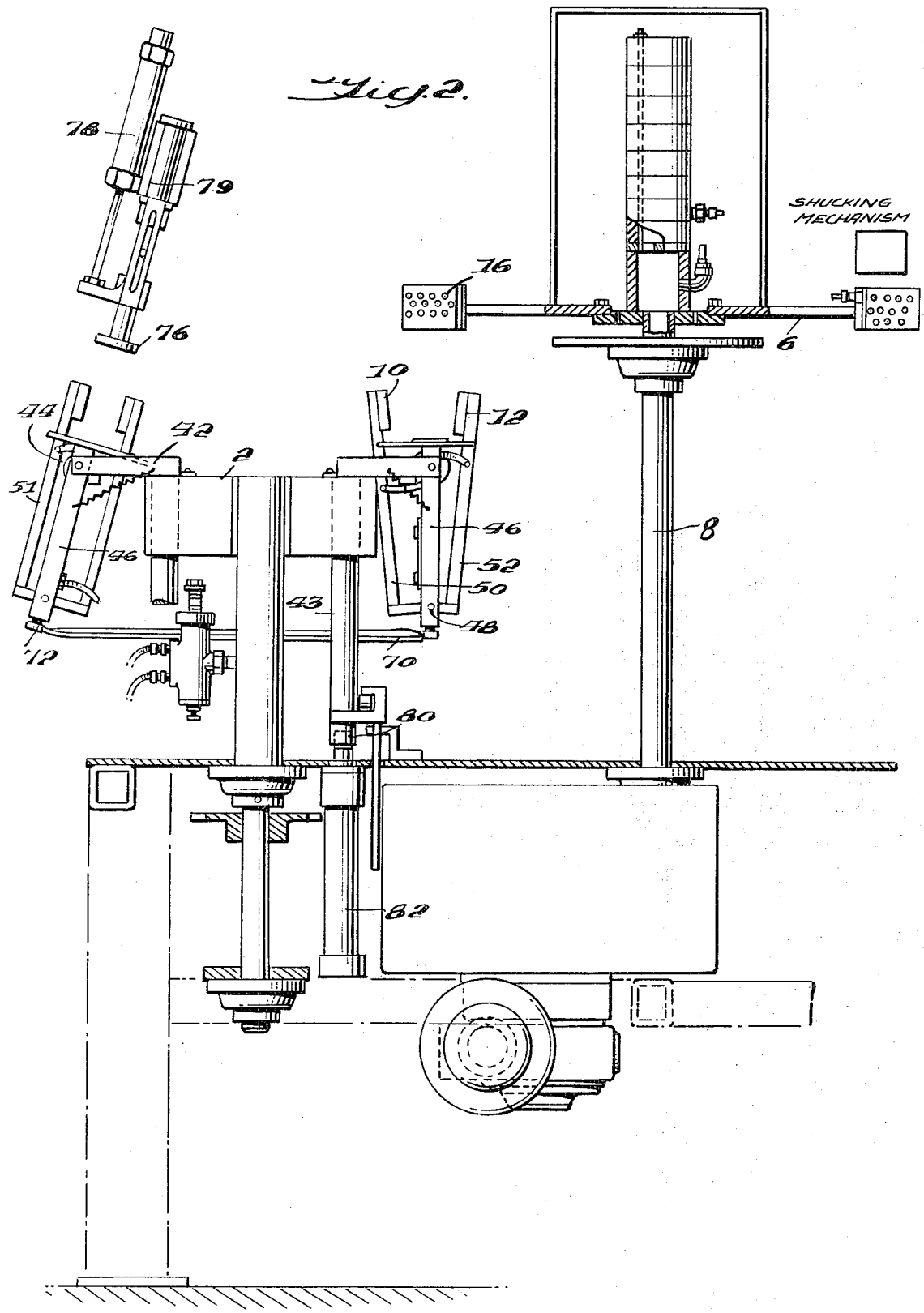
FIG. 2 shows, principally in side elevation, again with certain parts shown only diagrammatically, a bivalve shucking machine embodying the invention.

Mounted adjacent a part of the periphery of the path of the members mounted on the carrier 2, and eccentric with respect thereto, is a cam track 70. The lower end of each of bars 46 carries a wheel 72 which engages on the outside of this cam track. The result is that, as the holding members pass through the three $B_2$ positions, the vibration positions, the holders with the bivalve held there between are tilted to the position shown at the left in FIG. 2.

When the vibalves come into these vibration positions, a vibrator 79 having a head 76 is advanced by a pneumatic cylinder 78 until the head engages the upper end of the bivalve held in the members 10, 12.

Vibrator 79 may be then energized (or it may be continuously energized) and imparts vibration to the shells and to the meat therebetween. This vibration settles the meat between the shells and insures that it occupies the space left free by the removal of the liquid between the shells.

Such a vibrator may be one of the types described in Bulletin No. 30, Branform Vibrator Company.

As the machine is designed to operate at the rate of an oyster for every three seconds, and as it has been found that as much as four seconds of vibration may be desirable, three vibration positions each giving about 1 ⅓ seconds of vibration time are used in order to allow for indexing time between stations.

TRANSFER MECHANISM

The carrier 2 now turns to the transfer position $C_2$, the member 46 returning to a vertical position.

The sliding members 43 now come into position over pushing member 80 capable of being moved upwardly by a pneumatic cylinder 82. Assuming that a bivalve is held between the holding members 10 and 12, this raises the bivalve into a position between the shell gripping members or clamps 16.

Each shell gripping member 16 is composed of a box-like member (FIGS. 8 to 10) from the opposite faces of which extend smaller diameter pins 84 and larger diameter pins 86 slidably mounted in the members 16, the pins 86 being two in number and being located approximately half way up the face of the gripping member. The smaller pins 84 are actuated by pistons 88 in pneumatic cylinders, to which air pressures can be admitted from both sides. The larger pins 86 can be pressed outwardly by coil springs 90 and can be retracted by a piston connected to piston rod 92 and slidable in cylinder 94 to which likewise air pressure can be admitted in such a direction as to cause withdrawal of the pins 86. The pressure exerted by the pins 84 can be as great as desired, depending upon the pressure of the air admitted behind the pistons 88.

When the bivalve held by holders 10 and 12 reaches the transfer station, cylinder 82 is energized and raises the holders between the clamps or gripping members 16.

CENTERING MECHANISM

It is important that the top part of the oyster be properly positioned at substantially equal distances from the opposed faces of the shell gripping members 16, in order that it may be held firmly for the action of the saw blade to be described below.

For this purpose, there is provided (FIGS. 11 and 12) at the transfer position in the path of upward movement of a bivalve held by the holding members 10,12 a stop member 96 in the path of a bivalve moving upwardly between the gripping members 16. It is obvious that, when a bivalve is placed by hand between the holding members 54 it may be inclined to one side or the other, which might interfere with its being properly gripped. In order to center the upper part of the bivalve, the frame member 98 on which the stop 96 is located is provided with arms 100 pivoted at 101 and swingable towards each other by slotted levers 102 secured to the arms 100 and operated by a piston rod 103 of a piston slidable in the pneumatic cylinder 104. The free ends of arms 100 are connected by cross bars 105. These bars have projecting pins 107 for engaging the shells, the central pin being shorter than the outer pins. As will be clear from the broken line position shown in FIG. 11, when the piston rod 103 is raised the bars 105 are moved towards each other and engage on opposite sides of a bivalve held in the holders 54, thus centering the bivalve with respect to the gripping members 16.

Thereafter, air pressure is admitted behind pistons 88 (FIG. 9) and pins 84 are projected under relatively high pressure to grip the bivalve between clamps 16, at the same time, the arms 100 are swung upwardly so as to move the bars 105 out of the path of movement of the bivalve around the axis 8. When the bivalve has been so gripped, the holder is withdrawn to the position shown in FIG. 6 at the right thus leaving the bivalve held between the gripping members 16.

CUTTING MECHANISM

The bivalve held by the pins 84 is now moved to position $B_6$ (FIGS. 13, 14). Opposite the position $B_6$ is a cutter comprising a saw blade 107 driven by a motor 108 mounted on an arm 109 pivoted at 110 on the machine frame 111. The arm 109 can be advanced and retracted by a piston rod 112 connected to a piston in pneumatic cylinder 113.

On the outside of the path of the bivalve held in the gripping members 16 is a fixed frame 114, secured on the machine frame, with a downwardly extending lug 115 in which is slidably mounted a back-up plate 116. This back-up plate is normally retracted to the positions shown in solid lines by a spring 117, but can be extendeed by a piston rod 118 connected to a piston slidable in a pneumatic cylinder 199. The path of travel of the bar 116 extends to the broken line position shown in FIG. 14 so as to engage the top portion of the shells of the bivalve at a point slightly above the plane of travel of the saw blade 107.

Thereafter, the saw blade is advanced by the cylinder 113 and cuts off the top of the bivalve, while the bivalve is firmly gripped by the pins extending from the gripper member 16.

SHUCKING MECHANISM

After completion of this operation, the bivalve is then transmitted by further rotation of the carrier 6 to the station $C_6$.

The shucking mechanism located at station C is shown in FIGS. 15 to 17.

The carriage 6 has a vertical wall 120 which carries two tracks 121 formed by angle irons and guiding the cross-piece 122 of a T 123. This T is welded to the back of a cylindrical support member 124 to which is connected a piston 125 actuated by a cylinder 126. A block 127 is carried by the sleeve 124.

At the lower end of sleeve 124 are lugs 128 between which are pivoted separating members formed of legs 129 carrying rollers 130 and other legs 131 the bottom ends of which are provided with feet 132. The spreader lever is pivoted on a pin 133 mounted in the lugs 128, and also pivoted on this pin on the outside of lugs 128 are arms 134 which carry the anti-spreaders 135. Integral with arms 134 are arms 136 which are connected to the piston rod 137 of a pneumatic cylinder 138 pivoted at 139 on an extension 140 of the block 127.

The wall 120 also carries projecting bars 144 having grooves 146 facing each other in which is slidable a plate cam 148. The plate cam has surfaces 150, 152 respectively engageable with the rollers 130 on the arms 120. It will be noted that the slope of the cam surface 150 is less than that of the cam surface 152, the purpose of this being to spread the right hand spreader which engages in the top shell of the oyster further than the left hand spreader which is engaged in the bottom shell, taking into account the fact that the top shell is considerably deeper than the bottom shell.

The anti-spreaders are shown in detail in FIGS. 21 to 24. The box-like member 154 has three openings 156 therein, these openings being somewhat divergent away from the front end. There is also a notch 158 in the top wall, to prevent possible interference with the feet 129. In each of the openings 156 is a pin 160 into which engages a bolt 162 with a washer 163 to limit outward movement of the pins (to the left in FIG. 21). At the free end of the pin is a universally mounted head 164, which is engaged by a spring 166 to push it outward. The face 168 of the head is cross-grooves as shown in FIG. 24 in order to increase the gripping effect.

Upward movement of the sleeve 124 is produced by a coil spring 170 connected to a pin 172 on the block 127 and to a pin 174 mounted on the frame, as well as by a similar spring 176 connected to a projection 178 from the T-shaped member 123 extending through a slot 180 in the wall 120. Upward movement of the plate cam 148 is produced by a coil spring 180 connected near the top of the plate spring and also connected to the frame at 182.

Downward motion of the sleeve 124 is produced by a cam 184 mounted on a shaft 186 passing through wall 144. This cam cooperates with a roller 188 mounted on a bar 190 secured on one side of the leg of the T 123.

Downward movement of the plate cam 148 is produced by a cam 192 likewise mounted on shaft 186 and engaging a roller 194 mounted on a bracket 196 secured on the back of the plate cam.

The plate cam 148 has in its upper edge a notch 198 so that its movement does not interfere with that of the leg which supports the sleeve 124.

The knives for severing the adductor muscles and their movement is shown in FIGS. 17A, 18A, to 18C and 19.

In the bottom end of a holder 199 connected to the piston rod of piston 200 which slides in a cylinder 201 in the sleeve 124, is an opening in which are secured the stems 204 of two adductor muscle cutting knives, these stems being held together at 202. The stems 203 have a narrower portion and thereafter shoulders 206 merging into a wider portion 208. On the lower ends of the portions 208 are the blades 210, which preferably are formed of rubber or a flexible plastic material.

Slidable in the sleeve 124 is a sleeve 212, which at its upper end has an outwardly directed flange 214 to limit downward movement of the sleeve upon engagement with a flange 216 on the interior of the sleeve.

As shown in FIG. 19, the width of the wider portions 208 of the knives stems is substantially equal to the internal diameter of the sleeve 212. The result is, as shown in FIG. 18B, that, as long as the knives are retracted into the sleeve 212 to the extent shown in FIG. 18B, the stems are held close together, so that the knives cannot spread wide apart.

At the beginning of the shucking operation the parts are in the position shown in FIGS. 18A and 18B. As the knives are moved downwardly by the piston 200, the sleeve 212 moves with them because of the frictional engagement of the wider portions of the knife stem with the inner wall of the sleeve until it strikes flange 216, whereupon its movement stops and, as shown in FIG. 18C, the knives continue to move downward. As soon as the wider portions 208 move out of the sleeve 212, the knives spring apart because of the resilience of the knife stem to the position shown in FIG. 18C.

Mounted on the outwise of the sleeve 124 and extending downwardly from its lower end are two V-shaped guides 218, the purpose of which is to maintain the tips of the blades 210 turned inardly until they reach the upper edge of the bivalve shell, whereupon they are spread apart.

On the outside of the back guide 218, that is, the side nearest the axis of rotation of the carrier, there is a pipe 220 which opens into a hole 222. It has been found that in shucking oysters the best results are obtained if the "belly" of the oyster is pushed outwardly at this oint, since if it is too upright it may interfere with the movement of the knives, resulting in damage to the meat of the oyster. The water spray from the hole 222 results in pushing the meat of the oyster away from the axis of rotation of the carrier 6 and into a position where it is not likely to be damaged by the blade. additionally, the water will go between the shells and will lubricate the sliding of the meat out of the shells when it has been severed from them as well as wash the meats.

When the knives are retracted after they have been passed down through and between the path of the bivalves, they remain spread apart as shown in FIG. 18C until the sleeve 212 reaches the upper end of its path, whereupon the wider portions 208 enter the sleeve 211 and press the blades together into the position shown in FIG. 18B.

Figure 20B:
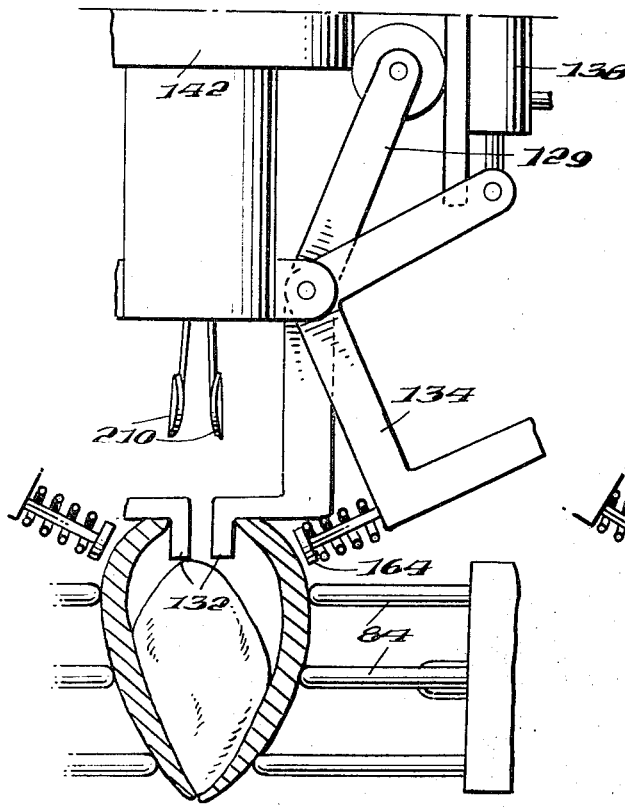

COming now to FIGS. 20A to 20G, these show the various steps of the shucking operation. In stage 1, as shown in FIG. 20A, the feet 132 are close together, the anti-spreaders 135 are retracted, and the knives are withdrawn. The bivalve is gripped by the smaller pins 84, with the hole in the top directed upwardly. The knives are in their most retracted position, shown in FIGS. 18A and 18B.

The cams 184 and 192 now advance the sleeve 124 and the plate cam 148 by equal distances, the rollers 130 remaining at the beginning of the slopes of the cam edges 150 and 152 (FIG. 20B), and the feet 132 enter the hole in the top of the shell.

Figure 20C:
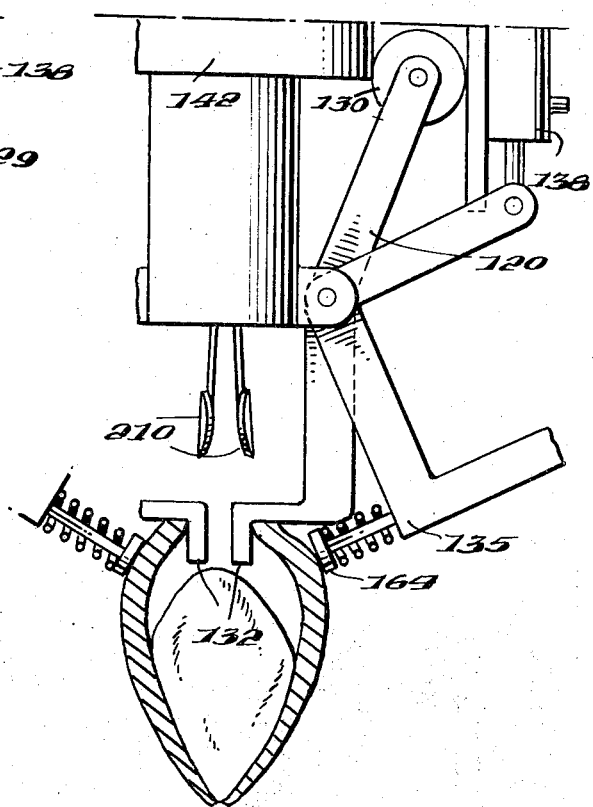

Coming to the position of FIG. 20C, the cylinder 138 is energized to turn anti-spreaders 135 in such a direction that their heads 164 engage the outside of the top part of the shell. The cylinder 138 may be supplied with air under substantially different pressures. In this stage it is supplied with air under pressure of about 15 psi so that it exerts a relative light pressure on the outside of the top edge of the shell.

Figure 20D:
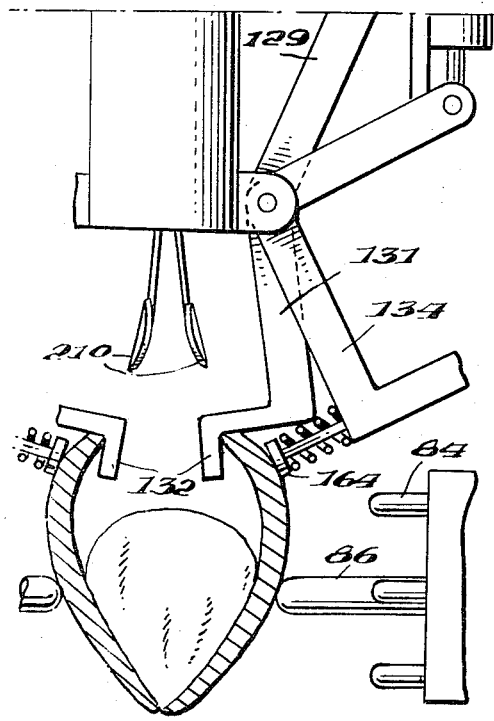

Now the plate cam is moved downwardly to spread the legs 131 in such a direction as to move the feet 132 apart (FIG. 20D). Since these are engaged in the top edge of the shell, they spread apart the top edges and enlarge the hole for the entry of the knives. Pins 84 are withdraw and pins 86 advanced. As the feet are opening the hole, the knives are advanced from the position of FIG. 18A to that of FIG. 18C. For this purpose (FIG. 20E), the cylinder 201 is actuated to push down the piston 200, so that the knives along with the sleeve 212 move out of the sleeve 124. As soon as the sleeve 212 stops its downward movement, the continued movement of the knives as shown in FIG. 18C results in their spreading apart into engagement with the inner walls of the shell. At the same time, the free ends of the knives move out of the guides 218.

At the same time that the cylinder 201 is energized, the preesure in cylinders 138 is substantially increased so as to grip the shells more firmly during the cutting of the adductor muscles.

Figure 20E:
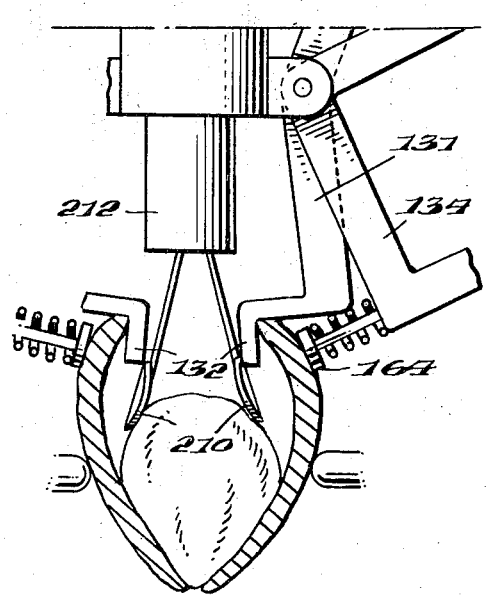
Figure 20F:
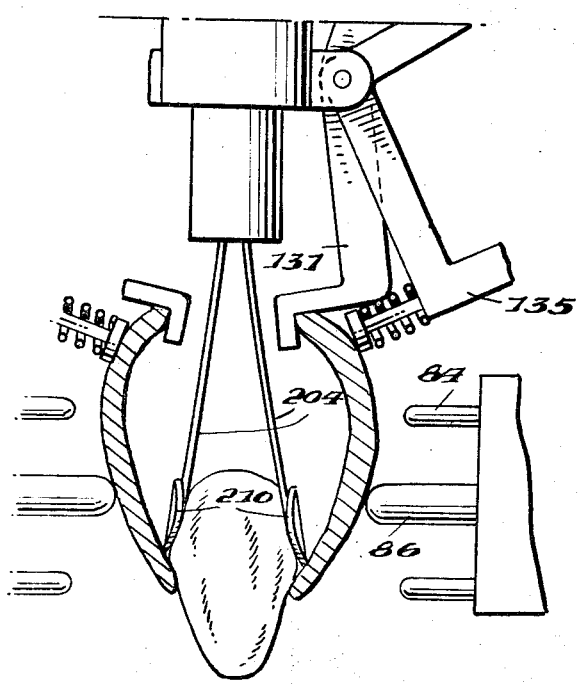
Figure 20G:
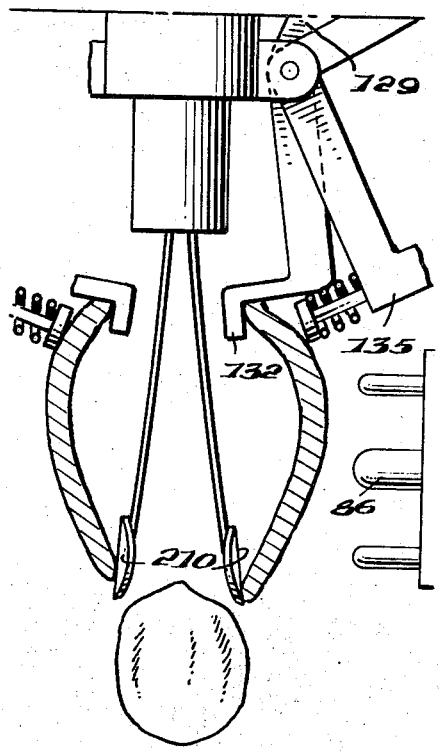
Figure 21:
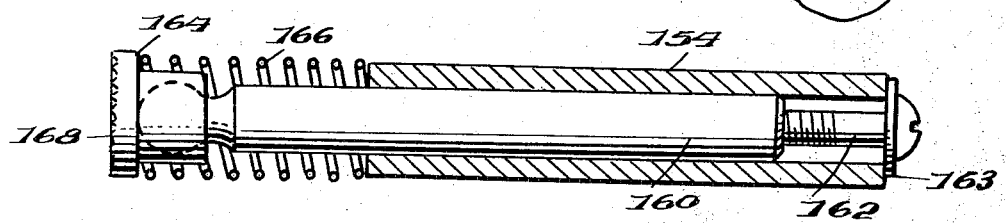
FIG. 21 shows in cross-section the outside gripping device.
Figure 22:
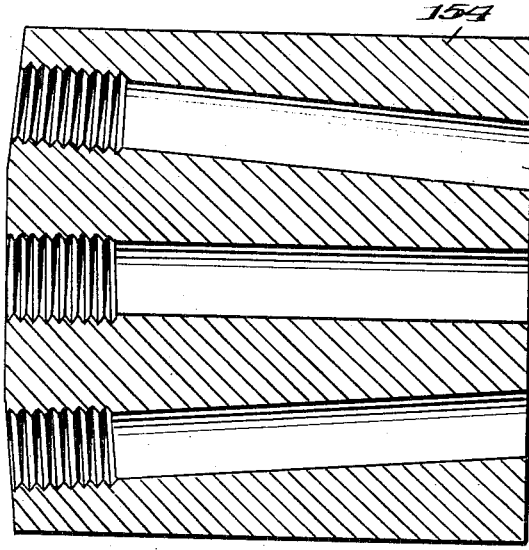
FIG. 22 is a horizontal cross-section through the receiving block of FIG. 21
Figure 23:
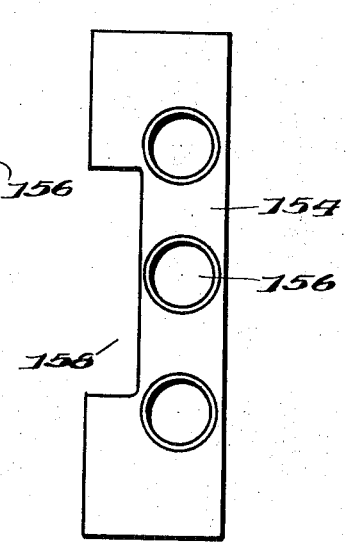
FIG. 23 is an end view thereof.

Thereafter, the knives are pushed downward as shown in FIG. 20F, spreading apart the bottom ends of the shells while they simultaneously sever the adductor muscles, so that the oyster meat is free to drop out through the open bottom edges of the shells. The knives move then to the position shown in FIG. 20G where the lower ends are completely below the shells assuring the ejection of the meat of the bivalve.

When this position is reached, the large pins 86 are withdrawn, the smaller pins 84 being kept withdrawn. This prevents pressure on the outside of the shells as the knives are retracted through the space between their bottom edges, and substantially reduce the danger of injury to the knives.

As the knives retract, they pass through the positions of FIG. 20F and 20E, although of course the meat has been removed. As this is done, the pins 86 advance. Now, as the knives move back up into the sleeve 212, the anti-spreaders 134 are returned to the position shown in FIG. 20B, so that the upper edge of the oyster is no longer gripped and then to the position shown in FIG. 20A. During all this time the large pins 86 are advanced while the small pins 84 are kept retracted.

The gripping device 16 now moves on to station $D_6$, at which the pins 86 are retracted so as to drop the shells for disposal.

SHELL SEPARATING

Referring now to FIGS. 25 to 27, it sometimes happens that bivalves are so distorted that the action of the spreaders and knives knocks the shells along with the meat, or separate therefrom, out of the clamps at the shucking station. To prevent shell parts from passing out into the receive for the meats, which may be a grading mechanism, there is, below the shucking mechanism, a trough 320 of V shape secured on the outside of a tube 322, leaving a space 324 which is large enough to pass the oyster meats, while the shells, if any, will enter the pipe 322 and be discharged.

In both FIGS. 28 and 29, the input arrows to the valves indicate connections to a compressed air supply, which connections may where necessary contain pressure reducing valves so that the pressure to each operating cylinder can be controlled as desired. FIG. 28 shows the pneumatic control system for the gripping members 16.

Large pins 86 are controlled by valves 226 actuated by hydraulic cylinders 228 in turn controlled by valves 230a, 230b mounted on the carriage 6. These last valves are spring-pressed towards exhaust position so that valve 226 normally remains in any position to which it is moved, shown as pressure position in FIG. 28, which means that pins 86 are withdrawn. Actuation of valve 230a will supply pressure fluid to left-hand cylinder 228 and will move valve 226 to exhaust position, releasing pins 86 for extension by springs 86.

Valves 230a and 230b are controlled by cylinders 232 mounted on the machine frame and having piston rods which come into line with rods connected to valves 230a, 230b at each station of the carrier 6 at which any change in the position of pins 86 is necessary. Cylinders 232 are supplied with pressure fluid or exhausted by valves 234 controlled by cams 236a, 236b on a cam shaft 238.

Pins 84 are controlled by a valve 240 which can supply fluid to or release it from either side of pistons 88. This in turn is moved in one direction or the other by cylinders 242 controlled by valves 244 actuated by cylinders 246 again controlled by valves 248 operated by cams 250 on cam shaft 238.

Referring to FIG. 29, cylinders 76, 82, 104, 113 and 126 are controlled by valves 252, 254, 256, 258, and 260 respectively, each of which is in turn operated by cylinders 262 each controlled by a valve 264 controlled by a cam 266 on cam shaft 238.

Cylinder 62 is controlled by a valve 268 which is moved by the operator through push button 270 when the operator has positioned a bivalve between the jaws of the proportional holding device, and is moved to the other position, when the bivalve is gripped by pins 84, by engagement of the piston rod of a cylinder 272 controlled by valve 274 operated by cam 276 on shaft 238.

Cylinder 119 is controlled by a valve 278 controlled by cam 280 on shaft 238.

Cylinder 138 is controlled by a valve 282 which is connected through a pressure reducing valve 284 to the pressure source, and is controlled by a cylinder 286, valve 288 and cam 290. Cylinder 201 is controlled by a valve 292, cylinder 294, valve 296 and cam 298. The outlet of valve 292, when it is in position to advance the adductor muscle cutting knives is also connected to cylinders 138 through a check valve 300. Thus, when valve 282 is moved to a position for advancing the anti-spreaders, the pressure exerted in cylinder 138 is relatively small, and the anti-spreaders engage the shell relatively lightly, whereas, when the knives are advanced, the anti-spreaders are put under much higher pressure through the line containing valve 300.

We claim:

1. A method of shucking bivalves which comprises removing a substantial part of the liquid from between the shells, thereafter holding the bivalves in upright position with the hinged end uppermost, subjecting the bivalves in such position to vibrations to shake the meat into the lower end of the shells, and cutting off from the bivalves in such position the hinged ends of the shells to form a hole therein, and thereafter separating the meat from at least one of the shells.

2. A method as claimed in claim 1, which includes separating the meat from both of the shells, and thereafter removing the meat from between the shells.

3. A method as claimed in claim 2, in which the step of separating the meat includes the step of inserting into the hole, while the bivalve is held in upright position with the hole upward, severing members to sever the adductor muscles.

4. A method as claimed in claim 3, in which the step of removing the meat includes the further step of separating the lower ends of the shells to allow the meat to drop out therebetween after the adductor muscles are severed.

5. A method as claimed in claim 3, in which the step of separating the lower ends of the shells includes the step of passing the severing members downwardly between said lower ends.

6. A method as claimed in claim 3, in which the step of removing the meat includes the step of spreading apart the upper ends of the shells before the insertion of the severing members thereinto.

7. A method as claimed in claim 2, in which the step of removing the meat includes the step of separating the lower ends of the shells to allow the meat to drop-out therebetween after the adductor muscles are severed.

8. In a method of shucking bivalves having the top part removed to provide a hole therein, the steps of grasping the upper ends of the shells adjacent the hole from the inside an outside, spreading apart the edges of the hole while the shells are so held, and passing severing members between the spread shells in engagement with the interior thereof and through the shells to sever the adductor muscles and thereafter to spread apart the lower ends of the shells while the upper ends are grasped, the upper shell of the bivalve being moved further than the lower shell during such spreading.

9. In a method of shucking ungraded bivalves having their adductor muscles at different distances from their side edges, the steps of positioning successive bivalves in a constant orientation with respect to a path of travel with the adductor muscles in the same position transversely of said path, cutting off the hinge ends of the shells of the bivalves to form a hole, mvoing said bivalves in said path to an adductor muscle severing station having at least one severing member movable across said path into said hole in a course fixed with respect to said path and having the same relation to the path as the adductor muscles, and moving said severing members in said course, thereby severing at least one of the adductor muscles.

10. A method as claimed in claim 9, in which said severing station has two severing members, moving both said severing members in said course, thereby severing both adductor muscles.

11. A method as claimed in claim 10, in which the bivalves are positioned with the hole uppermost, the step of thereafter spreading apart the lower ends of the shells to allow the meat to fall out therebetween.

12. A method as claimed in claim 11, in which the step of removing the meat includes the step of spreading apart the upper ends of the shells before the insertion of the severing members thereinto.

13. A method as claimed in claim 12, including the step of grasping the upper ends of the shells adjacent the hole from the inside and outside during such spreading.

14. A method as claimed in claim 13, the step of moving the upper shell of the bivalve further than the lower shell during such spreading.

15. A method as claimed in claim 9, including the step of spreading apart the upper ends of the bivalves before the insertion of the severing member thereinto.

16. A method as claimed in claim 15 including moving the upper shell of the bivalve further than the lower shell during such spreading.

17. A bivalve shucking machine which comprises a member mounted to move in a first path, means carried by said member to hold a bivalve inserted in proper orientation therein with its hinge uppermost and the plane of separation of the shells directed substantially transversely of said first path and the adductor muscles in substantially the same relationship transversely of the first path regardless of the size of the bivalve, means to move said member in said path, vibrator means positioned adjacent the path of movement of the holding means, means operatively connected to said holding means and to said vibrator means to produce engagement between a bivalve carried by said holding means and said vibrator means, bivalve gripping means, means mounting said gripping means for movement in a second path, said gripping means at one point in said second path being positioned in alignment with said holding means at a point in said first path beyond said vibrator means, means at such point to produce relative movement between the holding means and the gripping means to position the bivalve between the gripping means with the plane of separation of the shells directed transversely of the second path, means to actuate said gripping means to grip the bivalve claimed means to release the holding means, means to move the gripping means in said second path with the bivalve held thereby, means adjacent the path of the gripping means at a position beyond such point engageable with a bivalve held in the gripping means to cut off the top portions of the shells of the bivalve, leaving a hole therein, means at another place in the travel of the gripping means beyond such position to engage the edges of the shells adjacent the hole, means to move such engaging means apart to spread the top portions of the shells apart, at least one element insertable through the spread apart top portions to enter the bivalve from above and to engage the interior of a wall of one of the shells, and means to move said element downawrdly in a path which contains one of the adductor muscles of the bivalve to sever such adductor muscle.

18. A bivalve shucking machine as claimed in claim 17, having two elements insertable through the spread apart top portions to sever both adductor muscles 19. A bivalve shucking machine as claimed in claim 18 having means to spread apart the lower end of the shells to allow the meat to escape between the spread lower ends.

20. A bivalve shucking machine as claimed in claim 19 in which said last means comprise means to advance said severing means beyond the adductor muscles and between the lower ends of the shells.

21. A bivalve shucking machine as claimed in claim 17, in which the bivalve holding means comprises a pair of jaws mounted for movement transversely of the first path, and means to move the jaws towards one another with one jaw moving at a rate substantially different from the rate of movement of the other jaw.

22. A bivalve shucking machine as claimed in claim 17, in which the gripping means comprises a pair of jaws having opposed faces, and a plurality of pins slidable through said jaws to engage a bivalve positioned therebetween.

23. A bivalve shucking machine as claimed in claim 22 including means at said point operable on the top part of the bivalve while it is still held by the holding means and before the actuation of the gripping means to move a tilted bivalve into upright position.

24. A bivalve shucking means as claimed in claim 17, in which the means for engaging the edges of the hole comprises a pair of members having downwardly projecting feet movable into the hole.

25. A bivalve shucking machine as claimed in claim 17, in which said gripping means includes means for gripping the shells with a strong force and means for gripping the shells with a less strong force, means at such point to actuate the stronger gripping means, means operative when the bivalve reaches the shell engaging means, after such shell-edge-engaging means has been operated to engage the edges of the shell, to release said stronger gripping means and to bring said less strong gripping means into operation.

26. A bivalve shucking means as claimed in claim 25, in which the gripping means includes a pair of jaws having opposed faces and a plurality of pins movable through such jaws for gripping a bivalve therebetween, the means for exerting a stronger gripping force including fluid pressure means to project some of said pins, and the means to exert the less strong gripping force including spring means for projecting other of the pins.

27. A bivalve shucking machine which comprises a member mounted to turn about a vertical axis, means carried by said member and spaced from the axis to hold a bivalve inserted in proper orientation therein with its hinge uppermost, the plane of separation of the shells directed substantially towards said axis and the adductor muscles at substantially the same distance from said axis regardless of the size of the bivalve, means to turn said member, vibrator means positioned above the path of movement of the holding means, means operatively connected to said vibrator means to lower said vibrator means to engage a bivalve carried by said holding means, a table mounted for turning about a vertical axis, gripping means on said table remote from the axis of rotation thereof, said gripping means at one point in the rotation of said table being positioned above said holding means at a point in the rotation of said member beyond said vibrator means, means at such point to raise the holding means to position the bivalve between the gripping means, means to actuate said gripping means to grip the bivalve and to release and lower the holding means, means to rotate the table step-by-step with the bivalve held by the gripping means, means adjacent the path of the gripping means at a position beyond such engagement with a bivalve held in the gripping means to exert a pressure thereon from the one side, means engageable with the bivalve from the other side to cut off the top portions of the shells of the bivalves, leaving a hole therein, means at another place in the travel of the gripping means beyond such position to engage the edges of the shells adjacent the hole both internally and externally, means to move such engaging means apart to spread the top portions of the shells apart, elements insertable through the spread apart top portions to enter the bivalve from above and to engage the interiors of the walls of the shells, means to move said elements downwardly in a path which contains the adductor muscles of the bivalve to sever the adductor muscles and thereafter to spread apart the lower ends of the shells to allow the meat to escape between the spread lower ends, means to release said engaging means, said table being further rotated to move the gripping means to another location, and means to release the gripping means at such other location to release the empty shells.

28. A bivalve shucking machine as claimed in claim 27, in which the bivalve holding means comprises a pair of jaws spaced at different distances from the axis of rotation of the member, and means to move the jaws towards one another with one jaw moving at a rate substantially different from the rate of movement of the other jaw.

29. A bivalve shucking machine as claimed in claim 28, in which one jaw moves at substantially one and three quarter times the rate of the other jaw.

30. A bivalve shucking machine as claimed in claim 27, in which the gripping means comprises a pair of jaws having opposed faces, and a plurality of pins slidable through said jaws to engage a bivalve positioned therebetween.

31. A bivalve shucking machine as claimed in claim 30, having means to project some of said pins with a greater pressure than others of the pins.

32. A bivalve shucking machine as claimed in claim 31, in which the pins projected with the lesser pressure are in the lower parts of the jaws.

33. A bivalve shucking machine as claimed in claim 32, in which the means for projecting the pins with the lesser pressure comprises springs.

34. A bivalve shucking machine as claimed in claim 33, having fluid-pressure means to retract the pins with the lesser pressure.

35. A bivalve shucking machine as cliamed in claim 34, in which the means for projecting the pins with greater pressure comprises fluid-pressure means.

36. A bivalve shucking machine as claimed in claim 35, in which said means for cutting off the top of the bivalve comprises a cutter mounted to turn about a vertical axis, and means mounting the cutter for movement across the path of movement of the bivalve.

37. A bivalve shucking machine as claimed in claim 36, having a locking member mounted to move towards the path of movment of the bivalve from the side opposite said cutter, and means to advance said locking member into engagement with the bivalve before engagement thereof by the cutter.

38. A bivalve shucking machine as claimed in claim 37, in which said locking member is mounted to move in a substantially horizontal plane slightly above the plane of the movement of the cutter.

39. A bivalve shucking means as claimed in claim 27, in which the means for engaging the edges of the hole internally comprises a pair of members having downwardly projecting feet movable into the hole.

40. A bivalve shucking means as claimed in claim 39, in which the means for engaging the shell externally comprises members having projecting springpressed shell-engaging elements projecting therefrom.

41. A bivalve shucking means as claimed in claim 40, in which the shell engaging elements have roughened end faces.

42. A bivalve means as claimed in claim 39, in which the means for engaging the shell externally comprises arms movable towards and from the exterior of the shell, and said shell-engaging elements are loosely mounted on said arms.

43. A bivalve shucking machine as claimed in claim 27, in which the gripping means includes means for gripping the shells with a strong force and means for gripping the shells with a less strong force, means at such point to actuate the stronger gripping means, means operative when the bivalve reaches the shell-edge engaging means, after such shell-edge-engaging means has been operated to engage the edges of the shell, to release said stronger gripping means and to bring said less strong gripping means into operation.

44. A bivalve shucking means as claimed in claim 43, having means to maintain said less strong gripping means in operation during movement to such further location, and means to release the less strong gripping means at such location.

45. A bivalve shucking means as claimed in claim 43, in which the gripping means includes a pair of jaws having opposed faces and a plurality of pins movable through such jaws for gripping a bivalve therebetween.

46. A bivalve shucking machine as claimed in claim 45, in which the means for exerting a greater gripping force includes fluid pressure means to project some of said pins, and in which the means to exert the less strong gripping force includes spring means for projecting other of the pins.

47. A bivalve shucking machine as claimed in claim 27, having means at a position below said muscle severing means for separating oyster meats from oyster shells which may be accidentally released from said engaging and gripping means.

48. In a bivalve shucking machine, means to hold a bivalve with its hinge uppermost, means to engage the bivalve to impart vibration thereto to cause the meat of the bivalve to drop into the lower part of the space between the shells, and means operable on the bivalve after it has been subjected to the action of the vibrator means and while still held with its hinge uppermost to cut off the top of the shells to remove the hinge and provide a hole in the top of the shells.

49. A bivalve shucking machine which comprises means to move a bivalve in a path including holding means to hold a bivalve inserted therein with its hinge uppermost, vibrator means positioned above the path of movement of the holding means, means operatively connected to said holding means to raise said holding means to engage a bivalve carried thereby with said vibrator means, means adjacent the path of the bivalve at a position beyond such vibrator means engageable with a bivalve to cut off the top portions of the shells of the bivalve, leaving a hole therein, and means at another place in the travel of the bivalve beyond such position to enter the hole and sever at least one of the adductor muscles.

50. In a machine as claimed in claim 49, said last means operating on the bivalve while it is held with the hole uppermost and said muscle severing means including means to sever both adductor muscles and operative after severing the adductor muscles, to spread apart the lower ends of the shells to allow the meat to escape therebetween.

51. A bivalve shucking means as claimed in claim 50, having means at such place for engaging the edges of the hole internally comprising a pair of members having downwardly projecting feet movable into the hole, and means to produce relative separating movement between said members before the severing means enters the hole.

52. A bivalve shucking means as claimed in claim 51, having further means at such position for engaging the shell externally comprising members having projecting spring-pressed shell-engaging elements projecting therefrom.

53. In a bivalve shucking machine, means to carry bivalves in a predetermined path, a shucking member having at least one adductor-muscle-severing member movable transversely of such path in a fixed relationship to the path, means for engaging and holding bivalves in a position in which the adductor muscles of bivalves of differing sizes are positioned in substantially the same relationship transversely of the path in an upright position, said holding means including a pair of holding members, means mounting said members for movement transversely of said path and means to impart to such members differential motion towards each other.

54. In a bivalve shucking machine as claimed in claim 53, said mounting means comprising a pair of levers pivoted about parallel axes and having opposed clamping jaws, a rotatable disc mounted to turn about an axis parallel to the axes of turning of said members, and connecting means between said rotatable disc and said members, said connecting means comprising links pivoted to said disc at different distances from the axis of rotation thereof and pivoted to said members at different distances from the pivot axes thereof.

55. In a bivalve shucking machine as claimed in claim 54, a shucking mechanism having means to transport bivalves gripped by said holding means in said path, means engageable with bivalves moving in said path to cut off the tops of the shells thereof to provide a hole, and means for shucking said bivalve comprising elements mounted for entering the hole and engaging the inside of the top wall of each of the shells, and means for pulling said elements apart to spread the tops of the shells.

56. In a machine for shucking bivalves in which the bivalves are carried in a path and including means to cut off the tops of bivalves carried in such path, the bivalves in the path being in erect position with their hinged ends upwardly, means engageable with the hinged ends from above before the tops are cut off to agitate the bivalves and to cause the meat thereof to fall into the lower portion of the cavity between the shells so as to shake the meat into the lower part of the shell and to prevent injury thereto during the cutting operation.

57. A mechanism for separating the ends of the shells of a bivalve from which the hinge end has been removed to form a hole, compring means for engaging the interiors of the shells on either side of the hole and means for engaging the exteriors of the shells on either side of the hole, to clamp the shells therebetween, and means to produce relative separating movement between the shell engaging means on opposite sides of the hole, means for holding a bivalve with the hole facing said shell-engaging means and spaced therefrom, a support mounted for movement towards and from the holding means, said shell-engaging means being mounted on said support, the means for engaging the interiors of the shells including parts extending downwardly from and pivoted on the support and having feet enterable into the hole and members operatively connected to said parts having rollers thereon, and cam means engageable with said rollers for producing separating movement of said feet.

58. A mechanism as claimed in claim 57, including means for holding a bivalve with the hole facing said shell-engaging means and spaced therefrom, a support mounted for movement towards and from the holding means, said shell-engaging means being mounted on said support.

59. A mechanism as claimed in claim 58, in which the means for engaging the interiors of the shells include parts extending downwardly from and pivoted on the support and having feet enterable into the hole.

60. A machine as claimed in claim 59, in which the means for engaging the interiors of the shells include members operatively connected to said parts having rollers thereon, and cam means engageable with said rollers for producing separating movement of said feet.

61. A machine as claimed in claim 60, in which said cam means includes means to move both said shell interior engaging means, such moving means including means to move one of the shell interior engaging means by a substantially greater distance than the other.

62. A machine as claimed in claim 57, in which the means for engaging the exteriors of the shells are pivoted on said support.

63. A machine as claimed in claim 62, in which the means for engaging the exteriors of the shells include elements mounted for limited sliding movement in paths having a direction substantially tangential to the pivot axis of such means, and spring means urging said members into engagement with the exterior of the shells.

64. A machine as claimed in claim 63, in which the elements are mounted for universal movement about points in the axes of such sliding movements.

65. A machine as claimed in claim 64, in which the elements have roughened faces.

66. A machine as claimed in claim 57, in which the means for engaging the exteriors of the shells being pivoted to turn about an axis and including elements mounted for limited sliding movement in paths having a direction substantially tangential to the pivot axis of such means, and spring means urging said members into engagement with the exteriors of the shells, means for engaging the interiors of the shells on either side of the hole and means for engaging the exteriors of the shells on either side of the hole, to clamp the shells therebetween, and means to produce relative separating movement between the shell engaging means on opposite sides of the hole, the means for engaging the exteriors of the shells being pivoted on said support.

67. A machine as claimed in claim 66, in which the elements are mounted for universal movement about points in the axes of such sliding movements.

68. A mechanism for severing the adductor muscles of a bivalve from which the hinge end of the shells has been removed to provide a hole, comprising a hollow sleeve, and a pair of adductor-muscle-severing knives comprising resilient stems secured to each other at one end and extending through the sleeve and biased apart and adductor muscle-severing members at the other ends of the stems, and means mounting the knives for sliding movement within the sleeve, the portions of the stems adjacent the severing members having a width only slightly less than the internal diameter of the sleeve and the portions of the stems more remote from the severing members having a width substantially less than such internal diameter, whereby in the movement of the stems within the sleeve the severing members are held relatively close together until the wider portions of the stems energe from the sleeves, whereafter the severing members move apart under the influence of the bias of the stems, a support, and means mounting the sleeve for limited axial sliding movement within the support through a limited range, the frictional engagement between the stems and the interior of the sleeve being sufficient to cause the sleeve to move with the stem through such range during movement of the stems in a first direction towards said severing members, whereby the wider portions of the stems remain in said sleeve to maintain the severing members close together during movement of the sleeve through such range, whereafter further movement of the stem carries the wider portions thereof out of the sleeve, there being shoulders on the stems between the wider and narrower portions thereof, the engagement of such shoulders with the edge of the sleeve causing movement of the sleeve with the stems through said range during movement of the stems in the other direction, whereafter movement of the stems further into the sleeve causes the wider portions of the stem to enter the sleeve and draws the severing members towards each other.

69. A mechanism as claimed in claim 68, in which said severing members are wider than the wider parts of the stems and are formed of resilient material, oppositely facing channels extending from the support in the first direction of movement of the stems engageable with the tips of the severing members to hold the same close together during conjoint movement of the stems and sleeve in such first direction.

70. A mechanism as claimed in claim 69, one of said channels having a nozzle opening near its free end directed towards the other guide, and means to supply water to said nozzle opening.

71. A mechanism as claimed in claim 68, including means carried by said support for entering said hole and for engaging the interiors of the shells on either side of the hole and means to cause relative separating movement of the engaging means to spread the shells apart adjacent the hole before the knives advance between the shells.

72. A mechanism as claimed in claim 71, including means to engage the outsides of the shells on either side of the hole cooperating with said interior engaging means to grip the edges of the shells therebetween.

73. A mechanism as claimed in claim 72, in which said bivalve is held with the hole upwardly and said severing members move downwardly into the interior of the shells, said mounting means mounting the severing members for movement downwardly below the adductor muscles to spread apart the lower ends of the shells to allow the meat to drop out therebetween.

74. A mechanism as claimed in claim 73, in which said severing members are wider than the wider parts of the stems and are formed of resilient material, having facing channels extending from the support in the first direction of movement of the stems engageable with the tips of the severing members to hold the same close together during conjoint movement of the stems and sleeve in such first direction.

75. A mechanism as claimed in claim 68, comprising means for engaging the interiors of the shells on either side of the hole and means for engaging the exteriors of the shells on either side of the hole, to clamp the shells therebetween, and means to produce relative separating movement between the shell-engaging means on opposite sides of the hole.

76. A mechanism as claimed in claim 75, including means for holding a bivalve with the hole facing said shell-engaging means and spaced therefrom, a support mounted for movement towards and from the holding means, said shell-engaging means being mounted on said support.

77. A mechanism as claimed in claim 76, in which the means for engaging the interiors of the shells include parts extending downwardly from and pivoted on the support and having feet enterable into the hole.

78. A machine as claimed in claim 77, in which the means for engaging the interiors of the shells include members operatively connected to said parts having rollers thereon, and cam means engageable with said rollers for producing separating movement of said feet.

79. A machine as claimed in claim 78, in which said cam means includes means to move both said shell interior engaging means, such moving means including means to move one of the shell interior engaging means by a substantially greater distance than the other.

80. A machine as claimed in claim 77, in which the means for engaging the exteriors of the shells are pivoted on said support.

81. A machine as claimed in claim 80, in which the means for engaging the exteriors of the shells include elements mounted for limited sliding movement in paths having a direction substantially tangential to the pivot axis of such means, and spring means urging said members into engagement with the exteriors of the shells.

82. A machine as claimed in claim 81, in which the elements are mounted for universal movement about points in the axes of such sliding movements.

83. A mechanism as claimed in claim 68, in which said bivalve is held with the hole upwardly and said severing members move downwardly into the interior of the shells, said mounting means mounting the severing members for movement downwardly below the adductor muscles to spread apart the lower ends of the shells to allow the meat to drop out therebetween.

84. A mechanism for separating the ends of the shells of a bivalve from which the hinge end has been removed to form a hole, comprising means for engaging the interiors of the shells on either side of the hole, and means to produce relative separating movement between the shell-engaging means, said last means moving one of the shell-engaging means substantially further than the other.

85. A bivalve shucking machine which comprises means to hold a bivalve inserted in proper orientation therein with its hinge uppermost and the adductor muscles at substantially the same distance from a predetermined plane transverse to the plane of separation of the shells regardless of the size of the bivalve, vibrator means engageable with a bivalve held by the holding means, to impart vertical vibrations thereto, a movable carrier having gripping means thereon, said gripping means at one point in the movement of said carrier being positioned to engage a bivalve held by said holding means, means engageable with the tops of the shells of a bivalve located between said gripping means and held by said holding means to move a tilted bivalve to an upright position, means to actuate said gripping means to grip the bivalve and to release the holding means, means to move the carrier with the bivalve held by the gripping means, means adjacent the path of the gripping means at a position beyond such point engageable with a bivalve held in the gripping means to cut off the top portions of the shells of the bivalve, leaving a hole therein, means at another place in the travel of the gripping means beyond such position to engage the edges of the shells adjacent the hole, means to move such engaging means apart to spread the top portions of the shells apart, elements insertable through the spread apart top portions to enter the bivalve from above and to engage the interiors of the walls of the shells, and means to move said elements downwardly in a path which contains the adductor muscles of the bivalve to sever the adductor muscles and thereafter to spread apart the lower ends of the shells to allow the meat to escape between the spread lower ends.

86. A bivalve shucking machine as claimed in claim 85, in which the bivalve holding means comprises a pair of jaws spaced at different distances from the axis of rotation of the member, and means to move the jaws towards one another with one jaw moving at a rate substantially different from the rate of movement of the other jaw.

87. A bivalve shucking machine as claimed in claim 85, in which the gripping means comprises a pair of jaws having opposed faces, and a plurality of pins mounted in said jaws and slidable through said faces to engage a bivalve positioned therebetween.

88. A bivalve shucking machine as claimed in claim 87, having means to project some of said pins with a greater pressure than others of the pins.

89. A bivalve shucking means as claimed in claim 85, in which the means for engaging the edges of the hole internally comprises a pair of members having downwardly projecting feet movable into the hole.

90. A bivalve shucking means as claimed in claim 85, in which the means for engaging the shell externally comprises members having projecting spring-pressed shell-engaging elements projecting therefrom.

91. In a bivalve shucking machine having means to cut off the hinge end of a bivalve, means to hold a bivalve inserted in proper orientation therein with its hinge uppermost and the adductor muscles at substantially the same distance from a predetermined plane transverse to the plane of separation of the shells regardless of the size of the bivalve, a movable carrier having gripping means thereon, said gripping means at one point in the movement of said carrier being positioned to engage a bivalve held by said holding means, means engageable with the tops of the shells of a bivalve located between said gripping means and held by said holding means to move a tilted bivalve to an upright position and means to actuate said gripping means to engage the bivalve and to release said holding means.

92. Bivalve gripping means for shucking machine, said gripping means including means for engaging the shells with a relatively strong force and means for engaging the shells with a substantially smaller force, the gripping means including a pair of jaws having faces and each of the engaging means comprising a plurality of pins slidable through such faces to grip a bivalve therebetween, a first portion of the pins constituting the means for engaging the shells with a relatively strong force and a second portion of the pins constituting the means for engaging the shells with a substantially smaller force.

93. A bivalve gripping means as claimed in claim 92, in which the means for engaging the shells with a relatively large force includes fluid pressure means to project said first portion of said pins, and in which the means to engage the shells with the smaller gripping force includes spring means for projecting said second portion of the pins.

94. A bivalve gripping means as claimed in claim 93, including fluid pressure means to retract the second portion of the pins.

95. In a bivalve shucking machine, means to carry bivalves in a predetermined path, a shucking member having at least one adductor-muscle-severing member movable transversely of such path in a fixed relationship to the path, means for engaging and holding bivalves in a position in which the adductor muscles of bivalves of differing sizes are positioned in substantially the same relationship transversely of the path in an upright position.

* * * * *